(12) United States Patent
Shimizu et al.

(10) Patent No.: US 7,105,604 B2
(45) Date of Patent: Sep. 12, 2006

(54) SOFT PROPYLENE-BASED RESIN COMPOSITION

(75) Inventors: Fumihiko Shimizu, Yokohama (JP);
Kenjirou Takayanagi, Yokkaichi (JP);
Naomasa Sato, Yokohama (JP);
Fumiyoshi Yamada, Yokohama (JP);
Shixuan Xin, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/901,086

(22) Filed: Jul. 29, 2004

(65) Prior Publication Data

US 2005/0131160 A1    Jun. 16, 2005

Related U.S. Application Data

(63) Continuation of application No. PCT/JP03/00908, filed on Jan. 30, 2003.

(30) Foreign Application Priority Data

Jan. 31, 2002   (JP) .............................. 2002-023137

(51) Int. Cl.
   *C08F 297/08*   (2006.01)
   *C08F 110/06*   (2006.01)
   *C08L 23/10*    (2006.01)
   *C08L 23/14*    (2006.01)

(52) U.S. Cl. ........................ 525/191; 525/240; 526/351

(58) Field of Classification Search ................ 525/191, 525/240; 526/251, 351
See application file for complete search history.

(56) References Cited

U.S. PATENT DOCUMENTS

| | | | |
|---|---|---|---|
| 3,175,999 A | 3/1965 | Natta et al. | |
| 4,335,225 A | 6/1982 | Collette et al. | |
| 4,550,144 A | 10/1985 | Chiba et al. | |
| 4,841,004 A | 6/1989 | Kaminsky et al. | |
| 4,971,936 A | 11/1990 | Wilson et al. | |
| 6,342,565 B1 * | 1/2002 | Cheng et al. | 525/191 |
| 6,525,157 B1 * | 2/2003 | Cozewith et al. | 526/348 |

FOREIGN PATENT DOCUMENTS

| | | |
|---|---|---|
| DE | 198 82 607 T1 | 7/2000 |
| EP | 0 269 987 | 6/1988 |
| EP | 1 081 189 A1 | 3/2001 |
| EP | 1 106 647 | 6/2001 |
| JP | 9-510745 | 10/1997 |
| JP | 10-158351 | 6/1998 |
| JP | 11-349649 | 12/1999 |
| JP | 2000-143933 | 5/2000 |
| JP | 2000-186174 | 7/2000 |
| JP | 2001-064335 | 3/2001 |
| JP | 2001-310921 | 11/2001 |
| JP | 2002-234976 | 8/2002 |
| WO | WO 02/066540 A2 | 8/2002 |

OTHER PUBLICATIONS

J. W. Collette et al, "Elastomeric Polypropylenes from Alumina-Supported Tetraalkyl Group IVB Catalysts. 2. Chain Microstructure, Crystallinity, and Morphology", *Macromolecules*, vol. 22, No. 10, 1989, pp. 3858-3866.

J. C. Randall et al, "Carbon-13 Nuclear Magnetic Resonance Quantitative Measurements of Average Sequence Lengths of Like Stereochemical Additions in Polypropylene and Polystyrene", *Journal of Polymer Science*, vol. 14, 1976, pp. 2083-2094.

U. W. Suter et al, "Epimerization of Vinyl Polymers to Stereochemical Equilibrium. 2. Polypropylene", *Macromolecules*, vol. 14, No. 3, May-Jun. 1981, pp. 528-532.

G. Natta et al, "Properties of Isotactic, Atactic, and Steroblock Homopolymers, Random and Block Copolymers of α-Olefins", *Journal of Polymer Science*, vol. XXXIV, 1959, pp. 531-549.

D. T. Mallin et al, "rac-Ethyliden(1-$\eta^5$-tetramethylcyclopentadienyl)(1-$\eta^5$-indenyl)dichlorotitanium and its Homopolymerization of Propylene to Crystalline-Amorphous Block Thermoplastic Elastomers", *J. Am. Chem. Soc.*, vol. 112, 1995, pp. 2030-2031.

G. W. Coates et al, Oscillating Stereocontrol: A Strategy for the Synthesis of Thermoplastic Elastomeric Polypropylene, *Science*, vol. 267, Jan. 13, 1995, pp. 217-219.

Patent Abstracts of Japan, JP 10-195154, Jul. 28, 1998.

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

Soft propylene-based resin compositions, which comprise substantially the following block (I) and block (II):
  Block (I): propylene-based polymer having propylene unit chain segments that bond in a mode of head-to-tail bonding, in which the chain segment has an isotactic block-containing stereoblock structure;
  Block (II): copolymer containing at least propylene and ethylene, exhibit good flexibility, transparency, and heat resistance.

23 Claims, No Drawings

SOFT PROPYLENE-BASED RESIN COMPOSITION

CROSS REFERENCES TO RELATED APPLICATIONS

This application is a continuation of International Patent Application No. PCT/JP03/00908, filed on Jan. 30, 2003, and claims priority to Japanese Patent Application No. 2002-023137, filed on Jan. 31, 2002, both of which are incorporated herein by reference in their entireties.

BACKGROUND OF THE INVENTION

1. Field of the Invention

The present invention relates to novel, soft propylene-based resin compositions.

2. Discussion of the Background

Soft polyvinyl chloride has heretofore been widely used as a type of soft resin that has flexibility, transparency and heat resistance. However, since polyvinyl chloride produces harmful substances when incinerated, it is desired to develop a novel soft resin which can be substituted for soft polyvinyl chloride. Considering the production costs of resins, an olefin-based soft resin may be one candidate for it.

For example, it is known that ethylene-based resins prepared by copolymerization of ethylene with an $\alpha$-olefin to have a lower degree of crystallinity have good flexibility and transparency. However, when the content of the comonomer, $\alpha$-olefin is increased in the ethylene-based resin of this type in order to improve the flexibility and the transparency of the resin, the heat resistance of the resin is often lowered. Accordingly, it is extremely difficult to improve all three properties of flexibility, transparency, and heat resistance of ethylene-based resin.

On the other hand, atactic polypropylene is known as a type of propylene-based soft resin, which is produced by the use of a Ziegler-Natta catalyst or a metallocene catalyst. Of those, the atactic polypropylene that is produced by the use of a Ziegler-Natta catalyst has a broad molecular weight distribution and a broad stereospecificity distribution, and the amount of the sticky component in the polymer is large. Therefore, the polymer is difficult to apply to films and sheets. The other atactic polypropylene that is produced by the use of a metallocene catalyst can be specifically controlled to have a narrowed molecular weight distribution and a narrowed stereospecificity distribution, but its heat resistance is poor since atactic polypropylene is naturally an amorphous polymer. Accordingly, these types of atactic polypropylene also can not satisfy all the requirements of improved flexibility, transparency, and heat resistance, like the above-mentioned ethylene-based copolymer.

On the other hand, stereoblock-structured polypropylene that has isotactic and atactic segments is known. When the isotactic segment is increased in these polymers, then the crystallinity of the polymer is high and therefore the flexibility thereof is poor; and when the isotactic segment in this is reduced, the flexibility and the transparency of the polymer may be high, but the heat resistance thereof is poor and the polymer becomes significantly sticky. Accordingly, the polymer is defective in these points, and it can not satisfy all the requirements of improved flexibility, transparency, and heat resistance. In addition, since the known, stereoblock-structured polypropylene is extremely sticky as so mentioned above, it is generally produced through polymerization in an inert hydrocarbon solvent.

Further, a soft polypropylene-based resin composition that contains atactic polypropylene and an ethylene/propylene copolymer is now under investigation. However, both the atactic polypropylene and the ethylene/propylene copolymer to constitute the resin composition do not exhibit a melting point, or may exhibit a low melting point, and therefore, the resin composition comprising the two can not be very resistant to heat like the above-mentioned atactic polypropylene. To that effect, the resin composition could not satisfy all the requirements of improved flexibility, transparency, and heat resistance.

Thus, there remains for substitutes for soft polyvinyl chloride which do not suffer from the above-mentioned drawbacks,

SUMMARY OF THE INVENTION

Accordingly, it is one object of the present invention to provide novel soft polymers.

It is another object of the present invention to provide novel soft polymer compositions.

It is another object of the present invention to provide novel soft polymers which may be substituted for soft polyvinyl chloride.

It is another object of the present invention to provide novel soft polymer compositions which exhibit good flexibility, transparency, and heat resistance.

It is another object of the present invention to provide novel soft polypropylene-based polymers.

It is another object of the present invention to provide novel soft propylene-based resin compositions.

It is another object of the present invention to provide novel soft polypropylene-based polymers which exhibit good flexibility, transparency, and heat resistance.

It is another object of the present invention to provide novel soft polypropylene-based resin compositions which exhibit good flexibility, transparency, and heat resistance.

It is another object of the present invention to provide novel processes for preparing such soft polymer compositions.

These and other objects, which will become apparent during the following detailed description, have been achieved by the present inventors' discovery that, when the propylene chain structure in a soft polypropylene-based resin is specifically controlled, then the above-mentioned problems can be solved. In particular, when the propylene chain structure in a soft polypropylene-based resin is specifically controlled and when the resin is combined with a rubber component, then the resulting composition can effectively solve the above-mentioned problems. Specifically, the inventors have found that, when a soft polypropylene-based resin is so constituted that the polypropylene segment therein is macroscopically of a low-crystallinity, but microscopically, contains fine crystals exist therein and that the fine crystals are dispersed in the resin composition, then a resin that satisfies all the three requirements of improved flexibility, transparency, and heat resistance may be achieved.

Taking the above into consideration, the inventors have assiduously studied soft propylene-based resin compositions and, as a result, have found that a soft propylene-based resin composition that comprises a soft propylene-based resin, in which the propylene chain structure is an isotactic block-containing a stereoblock structure, and a rubber component can solve the above-mentioned problems, and have reached the present invention. In addition, the inventors have further found that the soft propylene-based resin that is obtained through precise control of the propylene chain structure therein can also solve the problems, and have achieved the present invention.

Specifically, in a first embodiment, the present invention provides soft propylene-based resin compositions that comprise substantially the following block (I) and block (II):

Block (I): a propylene-based polymer having propylene unit chain segments that bond in a mode of head-to-tail bonding, in which the chain segment has an isotactic block-containing stereoblock structure; and Block (II): a copolymer containing at least propylene and ethylene.

In a second embodiment, the present invention provides soft propylene-based resin compositions which exhibit properties (a) to (c):

(a) a tensile modulus, as measured according to JIS K 7113, of from 10 MPa to 300 MPa;

(b) an internal parallel light transmittance, as measured according to JIS K 7105, of from 70% to 100%;

(c) a peak top temperature in the melting point profile, as measured by DSC, in the range of from 100° C. to 165° C.; and wherein said resin composition substantially comprises soft propylene-based resin particles having a bulk density, measured according to JIS K 7365, of at least 0.3 g/cm$^3$.

In a third embodiment, the present invention provides stereoblock-structured, soft propylene-based resin compositions, which substantially comprise soft propylene-based resin particles having a bulk density, measured according to JIS K 7365, of at least 0.3 g/cm$^3$.

Stereoblock polypropylene itself is well known, but a soft resin composition produced by mixing a stereoblock polypropylene with a rubber component, especially with an ethylene/propylene copolymer has heretofore been unknown. Specifically, it may be considered that, since ordinary stereoblock polypropylene itself is a type of rubber component, no one would have hit on an idea of mixing the polymer with any other rubber component.

DETAILED DESCRIPTION OF THE PREFERRED EMBODIMENTS

The present invention will now be described in detail.

Thus, in a first embodiment, the present invention provides novel soft propylene-based resin compositions that comprise substantially the following block (I) and block (II):

Block (I): a propylene-based polymer having propylene unit chain segments that bond in a mode of head-to-tail bonding, in which the chain segment has an isotactic block-containing stereoblock structure; and Block (II): a copolymer containing at least propylene and ethylene.

Thus, the soft propylene-based resin composition of the present invention comprises substantially the block (I) and the block (II) (described hereinunder). The resin compositions of the present invention include both: (1) true block copolymers having both the block (I) and the block (II) in the respective unit polymer chains thereof; (2) physical mixtures of the two blocks; and (3) mixtures of these, i.e., mixtures of (1) and (2).

Block (I)

The block (I) is a propylene-based polymer which has a propylene unit chain segment bonding in the mode of head-to-tail bonding, and in which the propylene unit chain segment has an isotactic block-containing stereoblock structure. The molecular weight of the propylene-based polymer is not specifically limited. In general, the weight-average molecular weight of the polymer is at least 50,000, preferably at least 100,000, and is generally at most 2,000,000, preferably at most 1,000,000.

The meaning of the molecular weight of the propylene-based polymer is now described. When the soft propylene-based resin composition of the present invention is a true block copolymer of the block (I) and the block (II), then the total molecular weight of the segments derived from the block (I) polymer in one copolymer that comprises the resin composition is the molecular weight of the propylene-based polymer. On the other hand, when the resin composition is a physical mixture of the two blocks, then the molecular weight of the block (I) polymer is the molecular weight of the propylene-based polymer.

The weight-average molecular weight as referred to herein may be determined in accordance with a known method of using a commercially-available device with a solvent such as orthodichlorobenzene. Concretely, 20 mg of a sample is put into a 30-ml vial, and 20 g of orthodichlorobenzene that contains 0.04% by weight of BHT as a stabilizer is added thereto. The sample is dissolved in an oil bath heated at 135° C., and, while hot, this is filtered through a 3-µm pore PTFE (polytetrafluoroethylene) filter to prepare a sample solution having a polymer concentration of 0.1% by weight. Next, this is subjected to GPC, using a Waters' GPC150CV equipped with columns, TKSgel GMH-HT (30 cm×4) and an RI detector. The conditions are as follows: the amount of the sample solution injected into the device is 500 µl; the column temperature is 135° C.; the solvent is orthodichlorobenzene; and the flow rate is 1.0 ml/min.

The molecular weight of the sample is calculated as follows. A commercial product, monodispersed polystyrene is used as a standard sample. From the viscosity formulae of the polystyrene standard sample and the polypropylene sample, a calibration curve relating to retention time and molecular weight is formed, and the molecular weight of the propylene polymer is calculated. The viscosity formula is $[\eta]=K \cdot M^\alpha$. For polystyrene, $K=1.38\times10^{-4}$, and $\alpha=0.70$; and for polypropylene, $K=1.03\times10^{-4}$, and $\alpha=0.78$.

The propylene-based polymer of the block (I) is substantially formed of a propylene-containing polymer. Concretely, it includes, for example, (i) propylene homopolymers, and (ii) copolymers of propylene with ethylene and/or α-olefins having from 4 to 20 carbon atoms. Preferably, the propylene-based polymer is a propylene homopolymer, a propylene/ethylene copolymer, a propylene/1-butene copolymer, or a propylene/ethylene/1-butene copolymer.

When the propylene-based polymer is a copolymer, then it is desirable that the content of the olefin unit other than the propylene unit therein is as small as possible so that the final product, soft propylene-based resin composition is not sticky. In general, the content of the olefin unit other than the propylene unit in the propylene-based copolymer to form the block (I) is at most 10 mol %, preferably at most 5 mol %, more preferably at most 3 mol %, based on the total number of moles of monomer units in the copolymer.

The soft polypropylene-based resin composition of the present invention is characterized in that the block (I) therein is a polymer having propylene unit chain segments that bond in a head-to-tail bonding mode and the chain segment has an isotactic block-containing stereoblock structure.

The term isotactic block as referred to herein is meant to indicate a partial structure in which at least four propylenes bonded to each other in a mode of head-to-tail bonding and in which the absolute configuration of each of the methyl branches is the same. The existence of such a partial structure can be confirmed by the presence of the peak assigned to mmmm or to mmmr in $^{13}$C-NMR spectrometry.

The stereoblock structure also referred to herein means that the isotactic blocks bond to each other via a partial structure other than an isotactic block, or that is, via a propylene chain not having stereospecificity. The existence of a partial structure of this type can be confirmed by the presence of all or a portion of peaks assigned to rmmr, mmrr, mmrm, rmrr, rmrm, rrrr, rrrm, mrrm in $^{13}$C-NMR spectrometry of the polymer that form the block (I).

Atactic polypropylene may partially contain a few isotactic blocks. In this, the absolute configurations of the methyl branches of the propylene monomers are statistically at random, and this differs from stereoblock polypropylene. The concept of stereoblock polypropylene is known, for example, as in references, D. T. Mallin et al., *J. Am. Chem. Soc.*, vol. 112, p. 2030 (1990); G. W. Coates et al., *Science*, vol. 267, p. 217 (1995).

In the present invention, the $^{13}$C-NMR spectrum of each sample is determined as follows:

A sample (350 to 500 mg) is completely dissolved in about 2.2 ml of orthodichlorobenzene in a 10-mmφ NMR sample tube. Next, about 0.2 ml of deuterated benzene serving as a lock solvent is added to it, and this is homogenized. Then, this is analyzed according to a proton complete decoupling method at 130° C. The conditions are as follows: the flip angle is 90°; and the repetition time is at least 5 $T_1$ ($T_1$ is the longest value of the spin-lattice relaxation time for methyl group).

In propylene polymers, the spin-lattice relaxation time for the methylene and methine groups is shorter than that for the methyl group. Under the conditions as above, therefore, the magnetization recovery of all carbons is at least 99%. For increasing the determination accuracy, it is desirable to use an NMR device of at least 125 MHz for the $^{13}$C nuclear resonance frequency, and that the data acquisition is done for at least 20 hours.

The chemical shift of the peak top, based on the methyl group of the third unit of 5 propylene unit chains represented by mmmm, or that is, those all having the same absolute configuration of methyl branches of ten pentads (mmmm, mmmr, rmmr, mmrr, mmrm, rmrr, rmrm, rrrr, rrrm, mrrm) of head-to-tail bonding propylene unit chain segments, is defined as 21.8 ppm. With this as a standard, the chemical shift of the peak top that is based on the third unit methyl group of other pentads is determined. According to this standard, for example, the peak top chemical shift of the other nine pentads will be as follows. mmmr: 21.5 to 21.7 ppm, rmmr: 21.3 to 21.5 ppm, mmrr: 21.0 to 21.1 ppm, mmrm and rmrr; 20.8 to 21.0 ppm, rmrm: 20.6 to 20.8 ppm, rrrr: 20.3 to 20.5 ppm, rrrm: 20.1 to 20.3 ppm, mrrm; 19.9 to 20.1 ppm.

The pentad-derived peak chemical shift may vary in some degree, depending on the NMR measurement conditions employed. In addition, the peak is not always a single peak but may often show a complicated split pattern depending on the microstructure of polymer. Thus, the peak assignment must be attained, taking these points into consideration.

When the polymer of block (I) satisfies at least one of the following conditions (A) to (C), then the soft propylene-based polymer of the invention may have better physical properties. When it satisfies all these conditions (A) to (C), then the polymer may have even better physical properties. Moreover, when the polymer satisfies at least one or all these condition (A) to (C) and further satisfies the following condition (D), then the soft propylene-based resin composition of the invention will have better properties. The conditions (A) to (D) are for defining the crystallinity of the polymer of block (I). The conditions (A) and (B) relate to the regio-irregularity of propylene; the condition (C) relates to the stereospecificity thereof; and the condition (D) relates to the stereoblock property thereof.

Condition (A)

The polymer main chain has regio-irregular units based on 2,1-inserted propylene monomer and/or 1,3-inserted propylene monomer. Further, it is desirable that the polymer has 2,1-insertion and 1,3-insertion-derived regio-irregular units relative to the overall propylene insertion.

When this condition is satisfied, the soft propylene-based polymer of the present invention can be more flexible. The total amount of the 2,1-insertion and 1,3-insertion-derived regio-irregular unit relative to the overall propylene insertion is generally at least 0.05%, but preferably at least 0.1%, more preferably at least 0.5%, and is generally at most 5%, but preferably at most 4.5%, more preferably at most 4%. Two typical cases (A)-1 and (A)-2 are described below. In the former, the polymer to form the block (I) is a propylene homopolymer; and in the latter, the polymer to form the block (I) is a copolymer of propylene with ethylene and/or an α-olefin having from 4 to 20 carbon atoms.

(A)-1: The polymer to form the block (I) is a propylene homopolymer.

In general, propylene polymerization goes on regularly with 1,2-insertion in which the methylene group bonds to the active site of the catalyst, but may occur to a small extent with 2,1-insertion or 1,3-insertion. The propylene monomers polymerized in a mode of 2,1-insertion form regio-irregular units represented by the following partial structures (I) and (II), in the resulting polymer main chain. On the other hand, the propylene monomer polymerized in a mode of 1,3-insertion forms a regio-irregular unit represented by the following partial structure (III), in the resulting polymer main chain.

Partial Structure (I):

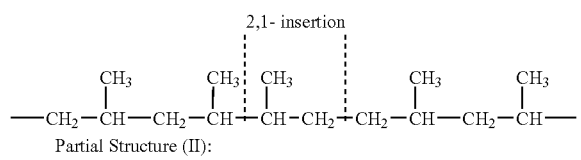

Partial Structure (II):

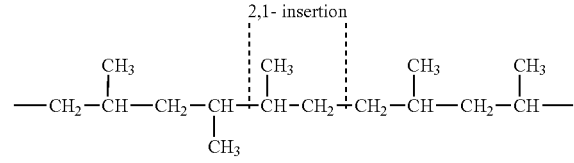

Partial Structure (III):

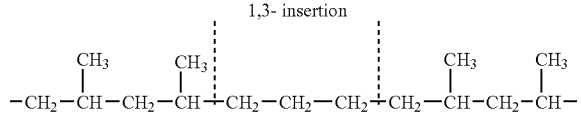

The proportion of 2,1-inserted propylene to the overall propylene insertion, and that of 1,3-inserted propylene to it are calculated according to the following formulae:

$$2,1\text{-Insertion Ratio } (\%) = \frac{\sum I(14.5 - 18.0)/2}{\sum I(CH_3)} \times 100$$

$$1,3\text{-Insertion Ratio } (\%) = \frac{\sum I(27.5 - 28.0)/2}{\sum I(CH_3)} \times 100$$

In the formulae, $\Sigma I(x\text{-}y)$ indicates the sum of integrated intensity of the signals appearing from x ppm to y ppm in the $^{13}$C-NMR spectrum; $\Sigma I(CH_3)$ indicates the sum of integrated intensity of the signal derived from all methyl groups except terminal. This is obtained according to the following formula:

$$\Sigma I(CH_3) = \Sigma I(14.5–18.0) + \Sigma I(19.5–24.4) + \Sigma I(27.5–28.0)/2$$

The signals appearing in the range of from 14.5 to 18.0 ppm are derived from the methyl carbons of 2,1-inserted propylene; and the signals appearing in the range of from 19.5 to 24.4 ppm are derived from the methyl carbons of 1,2-inserted propylene. The signals appearing in the range of from 27.5 to 28.0 ppm are derived from the two methylene carbons of the 1,3-inserted propylene.

(A)-2: The polymer to form the block (I) is a polymer of propylene with ethylene and/or an α-olefin having from 4 to 20 carbon atoms.

Based on the $^{13}$C-NMR spectrum thereof, the polymer may be analyzed in the same manner as that for (A)-1, and the 2,1-insertion and 1,3-insertion-derived regio-irregular units in the polymer can be quantified.

The regio-irregular units generally lower the crystallinity of polymer. Therefore, in the present invention, it is believed that the units may act to improve the flexibility of the polymer. If the propylene-based polymer does not have such regio-irregular units, then the stereospecificity of the polymer should be lowered or the comonomer amount in the polymer should be increased for lowering the crystallinity of the polymer. According to these methods, however, the polymer generally becomes extremely sticky and is therefore unfavorable for its practical use. Therefore, in consideration of the flexibility and the stickiness of polymer, it may be said that the structure having regio-irregular units in some degree in the main chain thereof is preferred for a good balance of the flexibility and the stickiness of polymer.

Condition (B)

The polymer main chain has regio-irregular units based on both 2,1-inserted propylene monomer and 1,3-inserted propylene monomer.

The polymer to form the block (I) in the present invention is preferably so designed that regio-irregular units derived from both: (1) 2,1-inserted propylene monomer; and (2) 1,3-inserted propylene monomer exist in the main chain of the polymer, as its crystallinity can be more effectively lowered and the flexibility thereof can be more effectively increased. More preferably, the proportion of the 1,3-insertion-derived regio-irregular units is larger than the proportion of the 2,1-insertion-derived regio-irregular units, since the polymer of this type has better physical properties in terms of stickiness etc.

Condition (C)

A partial structure that is assigned to a pentad represented by rmrm exists in the head-to-tail-bonding propylene unit chain segments in the polymer, and its proportion is at most 7% relative to all pentads of the head-to-tail-bonding propylene unit chain segments of the polymer.

When the block (I) to form the soft propylene-based resin composition of the present invention satisfies this condition, then the properties of the composition are good in terms of the flexibility thereof. The pentad of rmrm existing in the polymer may improve the flexibility of the polymer, but its proportion is preferably at least 0.2% relative to all pentads in the polymer. The partial structure of rmrm means the occurrence of two continuous errors in relation to the stereo-control of the catalyst.

Accordingly, the presence of such a partial structure may effectively disturb the crystallinity of the polymer of block (I), therefore providing a flexible resin. If, however, the proportion of this structure is over 7%, then the resin will be sticky. Therefore, the proportion of this structure is preferably at most 7%.

Condition (D)

In the methyl carbon-derived $^{13}$C-NMR peak pattern of the head-to-tail-bonding propylene unit chain segments in the polymer, the chemical shift of the peak top of the peak assigned to the pentad of mmmm is defined as 21.8 ppm. The ratio of the peak area $S_1$ for the peak top at 21.8 mm to the total area S of the peaks appearing within the range of from 19.8 ppm to 22.2 ppm is from 40% to 95%; and when the peak area for the peak top within the range of from 21.5 to 21.7 ppm is indicated by $S_2$, then $4+(2S_1/S_2)>5$ (that is, $S_1/S_2>0.5$).

The ratio of $S_1$ to S is generally at least 40%, preferably at least 50%, and is generally at most 95%, preferably at most 92%. The total 10 pentads of the head-to-tail-bonding propylene unit chain segments in the polymer shows the chemical shift represented by S, within the range of from 19.8 ppm to 22.2 ppm; and the ratio of $S_1$ to S is correlated with the stereoblock property of the polymer to form the block (I).

In general, when the ratio of $S_1$ to S is higher, then the crystallinity of the polymer to form the block (I) tends to be higher. When the ratio of $S_1$ to S is over 95%, then the crystallinity of the polymer is too high and the flexibility of the final product, propylene resin will be thereby significantly reduced. On the contrary, when the ratio of $S_1$ to S is smaller than 40%, then the resin will be significantly sticky and it is also unfavorable.

In the present invention, $5<4+(2S_1/S_2)$, but preferably $9<4+(2S_1/S_2)$. In general, $4+(2S_1/S_2)<500$, preferably $4+(2S_1/S_2)<300$.

The property that relates to $4+(2S_1/S_2)>5$ has a close correlation with an index of a polymer that is referred to as the "isotactic block index (BI)" by Waymouth et al (see JP-T 9-510745—the term "JP-T" as used herein means a published Japanese translation of a PCT application). BI is an index of the stereoblock property of a polymer, and it is defined as BI=4+2[mmmm]/[mmmr]. More concretely, BI indicates the mean chain length of an isotactic block that has 4 or more propylene units (J. W. Collete et al., *Macromol.*, vol. 22, p. 3858 (1989); J. C. Randall, *J. Polym. Sci., Polym. Phys. Ed.*, vol. 14, p. 2083 (1976)). A statistically complete atactic polypropylene may have BI=5. Accordingly, BI=4+2[mmmm]/[mmmr]>5 means that the mean chain length of the isotactic block in a polymer is longer than that of atactic polypropylene. In general, it is said that the crystalizable minimum unit in an isotactic propylene chain is 4 as the number of the monomers to form it.

In the present invention, $4+(2S_1/S_2)$ is not completely the same as the above-mentioned BI but almost corresponds to it. Therefore, the requirement of $4+(2S_1/S_2)>5$ means that the polymer of the present invention differs from atactic polypropylene and contains isotactic blocks having a crystalizable chain length.

One object of the present invention is to provide a novel, soft polypropylene-based resin compositions that have good flexibility, transparency, and heat resistance. One good means for satisfying good flexibility and heat resistance comprises introducing a stereospecificity distribution or a crystallinity distribution into the block (I). Specifically, when the block (I) is contolled to have a relatively low stereospecificity or a relatively low crystallinity as a whole, and when the block (I) is formed as a mixture of polymer chains that differ in point of the stereospecificity or the crystallinity, then the polymer comprising it may have good flexibility and heat resistance. The introduction of such stereospecificity distribution or crystallinity distribution into the polymer may be attained by polymerizing monomers in the presence of a mixture of two or more catalysts that differ in regard to the stereo-control property; or by blending polymers separately produced by the use of catalysts that differ in regard to the stereo-control property. The stereospecificity distribution and the crystallinity distribution may be confirmed as the elution temperature distribution in CFC (cross fractionation chromatography.

Block (II)

The block (II) is a copolymer that contains propylene and ethylene as the comonomers and optionally contains one or more α-olefins having from 4 to 20 carbon atoms as an additional comonomer, and this differs from the block (I). The total content of the ethylene and of the optional α-olefin having from 4 to 20 carbon atoms to be in the copolymer is from 0.1 to 40 mol %, based on the total moles of monomeric units. The ratio of ethylene to α-olefin having from 4 to 20 carbon atoms is not specifically limited, and may be suitably determined in accordance with the intended copolymer.

Preferred embodiments of the copolymer are propylene/ethylene copolymers, propylene/1-butene copolymers, and propylene/ethylene/1-butene copolymers. The molecular weight of the copolymer for the block (II) is not specifically limited. The weight-average molecular weight of the copolymer is generally at least 50,000, preferably at least 100,000 and is generally at most 2,000,000, preferably at most 1,000,000. The meaning of the term molecular weight of the copolymer is described as follows.

When the soft propylene-based resin composition of the invention is a true block copolymer of the block (I) and the block (II), then the total molecular weight of the segments derived from the block (II) copolymer in one copolymer that constitutes the resin composition is the molecular weight of the copolymer. On the other hand, when the resin composition is a physical mixture of the two blocks, then the molecular weight of the block (II) copolymer is the molecular weight of the copolymer.

If the total of the content of ethylene and that of the optional α-olefin having from 4 to 20 carbon atoms to be in the copolymer exceeds the range of from 0.1 to 40 mol %, then the physical properties of the resin composition will be bad. For example, when the total of the content of ethylene and that of the optional α-olefin having from 4 to 20 carbon atoms to be in the copolymer is larger than 40 mol %, then the resin will be flexible but its transparency tends to lower. Therefore, the total content is preferably at most 40 mol %. More preferably, the total content is from 5 to 40 mol %, even more preferably from 7 to 30 mol %, still more preferably from 10 to 25 mol %.

Soft Propylene-Based Resin Composition

The soft propylene-based resin composition of the invention comprises substantially the block (I) and the block (II). The term "substantially" as used herein means that the soft propylene-based resin composition of the invention contains the block (I) and the block (II) as indispensable components and the total of the two therein is at least 80% by weight of the soft propylene-based resin composition, and means that the resin composition may contain any optional components such as known additives, fillers, pigments, mineral oils, resin modifiers, and the like in an amount of generally at most 20% by weight, preferably at most 10% by weight.

Regarding the ratio of the block (I) to the block (II), the amount of the block (I) may be generally at least 5% by weight, preferably at least 20% by weight, more preferably at least 30% by weight, and generally at most 95% by weight, preferably at most 85% by weight, more preferably at most 80% by weight, relative to the total weight of the block (I) and the block (II). The amount of the block (II) may be generally at least 5% by weight, preferably at least 15% by weight, more preferably at least 20% by weight, and generally at most 95% by weight, preferably at most 80% by weight, more preferably at most 70% by weight, relative to the total weight of the block (I) and the block (II).

The molecular weight of the soft propylene-based resin composition of the present invention is not specifically limited. In view of the practical application thereof, the weight-average molecular weight Mw of the resin composition may be generally at least 70,000, preferably at least 130,000, more preferably at least 160,000, and generally at most 2,000,000, preferably at most 1,000,000.

If the molecular weight thereof is smaller than 70,000, then the mechanical properties such as the tensile strength of the resin composition will be low, and the resin composition will be extremely sticky. On the other hand, if the molecular weight thereof is larger than 2,000,000, then it is also undesirable since the moldability of the resin composition will be poor. The meaning of the term molecular weight of the soft propylene-based resin composition is described as follows.

When the soft propylene-based resin composition of the invention is a true block copolymer of the block (I) and the block (II), then the molecular weight of one copolymer that constitutes the resin composition is the molecular weight of the resin composition. On the other hand, when the resin composition is a physical mixture of the two blocks, then the molecular weight of the block (I) polymer and the block (II) copolymer is the molecular weight of the resin composition.

Method for Producing the Soft Propylene-Based Resin Composition

The method used to prepare the present resin compositions is not specifically limited, and any production method capable of producing the resin composition that satisfies the requirements of the present invention may be used.

In general, the block (I) is formed in a first polymerization step, and then the block (II) is formed in a second polymerization step; or the block (I) and the block (II) are separately produced through polymerization, and they are then physically mixed. The former method of two-stage polymerization to give a block copolymer of the block (I) and the block (II) is preferred. In each polymerization step of the method, the same metallocene catalyst may be used to reduce the production costs and to simplify the production process and the equipment, and therefore the method is advantageous for industrial application.

Method of Producing Block (I)

One characteristic feature of the block (I) is that it has an isotactic block-containing stereoblock structure. For forming the isotactic block-containing stereoblock structure, the following methods are employable: (a) a method of producing it through epimerization of polypropylene; and as other production methods that are characterized by the catalyst to be used therein, (b) a method of using a Ziegler-Natta catalyst, (c) a method of using a Collette catalyst, and (d) a method of using a single-site catalyst.

(a) Production Method with Epimerization of Polypropylene:

According to U. W. Suter et al., *J. Am. Chem. Soc.*, vol. 14, p. 528 (1981), epimerization (isomerization) of isotactic polypropylene with a catalyst such as Pd/C or Pd/Al$_2$O$_3$ gives atactic polypropylene. The report shows only the formation of statistically almost complete atactic polypropylene. However, when the reaction is stopped in the course of converting isotactic polypropylene to atactic polypropylene, then stereoblock polypropylene may be produced, and the stereoblock structure of the polymer may be controlled by controlling the temperature and the time for epimerization. In this production method, the polymer is difficult to control in regard to the microtacticity thereof, and the reaction requires a high temperature.

(b) Production Method with a Ziegler-Natta Catalyst:

Polymer production with a Ziegler-Natta catalyst is well known from the past. In *J. Polym. Sci.*, vol. 34, p. 531 (1959) and in U.S. Pat. No. 3,175,999, Natta produced propylene polymer with a TiCl$_3$-based catalyst and obtained stereoblock polypropylene from the polymer through solvent fractionation. On the other hand, U.S. Pat. No. 4,971,936 discloses a method for producing stereoblock polypropylene by the use of a Mg-supported catalyst. For controlling the stereoblock property of the polymer, it is known to add a Lewis base to control the stereo-control property of the catalyst used, and to specifically select the type and the temperature of the solvent and control the crystallinity of the polymer to be obtained through fractionation.

In these methods, a large amount of isotactic polypropylene and atactic polypropylene are produced as by-products. Therefore, in order to obtain the intended stereoblock polypropylene alone, a method of solvent fractionation such as that for Natta's polymer is required.

(c) Production Method with a Collette Catalyst:

Polymer production with a Collette catalyst is also known (e.g., U.S. Pat. No. 4,335,225; J. W. Collette et al., *Macromolecules*, vol. 22, p. 3851 (1989)). The Collette catalyst is represented by a formula R$_4$M/Al$_2$O$_3$, in which R is typically a benzyl group or a neophyl group, and M is typically zirconium. The catalyst makes it possible to produce stereoblock polypropylene, and it is known that, when the polymerization temperature and R in the catalyst are varied, then the stereoblock structure of the polymer produced may change. However, even the use of this catalyst can not avoid the production of the by-product, isotactic polypropylene. In addition, the molecular weight distribution and the stereospecificity distribution of the polymer obtained are broad, and, in general, the molecular weight of the polymer is relatively high.

(d) Production Method with Single-Site Catalyst:

Recently, methods of producing stereoblock polypropylene by the use of a single-site catalyst such as a metallocene catalyst have become known. The above-mentioned production methods (a) to (c) have some drawbacks, but the production method with a single-site catalyst is the most suitable for producing the soft propylene-based resin composition of the invention. This is because the single-site catalyst can control the microtacticity of the polymers produced with it, depending on the design of the ligand therein, and because the molecular weight distribution and the stereospecificity distribution of the polymer produced with it are relatively narrow.

Of various single-site catalysts, metallocene catalyst is preferred since they enable precision control of the microtacticity of the polymers produced with it. The microtacticity may be controlled by the ligand structure and by the polymerization conditions such as the temperature and the cocatalyst used. Production examples of stereoblock polypropylene by the use of a metallocene catalyst are given in the above-mentioned references, D. T. Mallin et al., *J. Am. Chem. Soc.*, vol. 112, p. 2030 (1990); G. W. Coates et al., *Science*, vol. 267, p. 217 (1995).

For controlling the degree of 2,1-insertion and/or 1,3-insertion into the main chain of polymer, as one characteristic feature of the present invention, the following methods are employable: (i) a method of controlling it by controlling the structure of the polymerization catalyst used, (ii) a method of controlling it by controlling the polymerization temperature, (iii) a method of controlling it by controlling the monomer concentration, and (iv) a method of controlling it by controlling the hydrogen concentration during polymerization. The temperature dependency, the monomer concentration dependency, and the hydrogen concentration dependency of the degree of 2,1-insertion and/or 1,3-insertion vary, depending on the catalyst used, and could not be indiscriminately limited. Accordingly, these conditions are to be controlled on the basis of the properties of the catalyst used.

For example, when a $C_1$-symmetric metallocene catalyst is used for controlling the ratio of the pentad of rmrm to the overall pentad in the polymer to be at most 7%, the ratio may be determined by the ligand of the catalyst. In one example, an azulene-based $C_1$-symmetric metallocene catalyst enables the pentad ratio control.

For controlling $S_1$ and $S_2$ to fall within the range of 40<$S_1$/S<95 (%) and 4+(2$S_1$/$S_2$)>5, the following methods may be employed: (i) a method of controlling them by controlling the structure of the polymerization catalyst used, (ii) a method of controlling them by controlling the polymerization temperature, and (iii) a method of controlling them by controlling the monomer concentration. The temperature dependency and the monomer concentration dependency of $S_1$ and $S_2$ vary, depending on the catalyst used, and could not be indiscriminately limited. Accordingly, these conditions are to be controlled on the basis of the properties of the catalyst used.

As mentioned hereinabove, the production method (d) with a single-site catalyst is preferred for obtaining polypropylene having a stereoblock structure. Of such single-site catalysts, preferred are bridged, $C_1$-symmetric ansa-metallocenes. Non-bridged metallocenes may be suitable for producing the soft propylene-based resin composition of the present invention. In general, however, bridged ansa-metallocenes are preferred from the viewpoint of industrial application thereof, as its heat stability is good. Of such bridged, $C_1$-symmetric ansa-metallocenes, more preferred are $C_1$-symmetric metallocenes of a group 4-transition metal having bridged, conjugated 5-membered ring ligands. Transition metal compounds of this type are known, and it is also known to use such compounds for a catalyst component for α-olefin polymerization.

One example of producing the block (I) with the above-mentioned single-site catalyst (d) is described below, in which a metallocene catalyst is used.

The reaction materials are selected in any desired manner from propylene as well as ethylene and/or α-olefin having from 4 to 20 carbon atoms in accordance with the intended constitutive components, and the amount of the reaction materials is determined in accordance with the ratio of the constitutive components of the intended polymer.

The polymerization method is not specifically limited, including, for example, a method of polymerizing the monomer in an inert hydrocarbon solvent such as propane, butane, hexane, heptane or toluene; a method of polymerizing the monomer in a liquefied α-olefin; and a method of gas-phase polymerization of the monomer substantially in the absence of a solvent. The method in which a solvent is not used is more preferred. A mode of solution polymerization is also employable in which the polymer formed dissolves in the solvent used.

In the case where a single-site catalyst is used and when the block (I) is formed in the first-stage polymerization step and then the block (II) is formed in the second-stage polymerization step, the amount of the block (I) to be formed in the first stage relative to the overall amount of the complete polymer to be produced is not specifically limited, but in general, the polymerization temperature and the polymerization time are so controlled that the amount of the block (I) could be from 5 to 95% by weight, preferably from 20 to 85% by weight, more preferably from 30 to 80% by weight, based on the total weight of block (I) and block (II).

In general, the polymerization temperature falls between −20 and 150° C., preferably between 0 and 100° C. Hydrogen is preferred for the molecular weight-controlling agent in this case.

For forming the block (I) in the present invention, the metallocene catalyst comprises the following catalyst component (A) as the indispensable component thereof, and preferably contains the following catalyst component (B). More preferably, the catalyst component (B) contains the following catalyst component (C).

Catalyst component (A): metallocene,
Catalyst component (B): cocatalyst,
Catalyst component (C): organoaluminium compound.
These components are described below.
Catalyst Component (A): Metallocene Metallocenes preferred for producing the propylene polymer of the present invention are $C_1$-symmetric metallocenes represented by the formula:

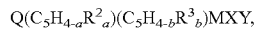

$$Q(C_5H_{4-a}R^2_a)(C_5H_{4-b}R^3_b)MXY,$$

in which Q represents a bridging group that combines the two conjugated 5-membered ring ligands; M represents a transition metal of Group 4 of the Periodic Table; X and Y each independently represent a hydrogen atom, a halogen atom, a hydrocarbon group having from 1 to 20 carbon atoms, an oxygen-containing hydrocarbon group having from 1 to 20 carbon atoms, a nitrogen-containing hydrocarbon group having from 1 to 20 carbon atoms, a phosphorus-containing hydrocarbon group having from 1 to 20 carbon atoms, or a silicon-containing hydrocarbon group having from 1 to 20 carbon atoms; $R^2$ and $R^3$ each independently represent a hydrocarbon group having from 1 to 40, preferably from 1 to 20 carbon atoms, a halogen atom, a halogen-containing hydrocarbon group having from 1 to 40, preferably from 1 to 20 carbon atoms, an alkoxy group having from 1 to 40, preferably from 1 to 20 carbon atoms, an aryloxy group having from 6 to 40, preferably from 6 to 20 carbon atoms, a silicon-containing hydrocarbon group having from 1 to 40, preferably from 1 to 20 carbon atoms, a phosphorus-containing hydrocarbon group having from 1 to 40, preferably from 1 to 20 carbon atoms, a nitrogen-containing hydrocarbon group having from 1 to 40, preferably from 1 to 20 carbon atoms, or a boron-containing hydrocarbon group having from 1 to 40, preferably from 1 to 20 carbon atoms, neighboring two $R^2$ and/or $R^3$ may bond to each other to form a 4- to 10-membered ring; a and b each independently indicate an integer, satisfying $0 \leq a \leq 4$ and $0 \leq b \leq 4$.

Concretely, the bonding group Q that bridges the two conjugated 5-membered ring ligands includes the following, and when Q contains carbon atoms, the number of the carbon atoms may be generally from 1 to 20. Specifically, it includes an alkylene group such as a methylene or ethylene group; an alkylidene group such as an ethylidene, propylidene, isopropylidene, phenylmethylidene, or diphenylmethylidene group; a silicon-containing bridging group such as a dimethylsilylene, diethylsilylene, dipropylsilylene, diphenylsilylene, methylethylsilylene, methylphenylsilylene, methyl-t-butylsilylene, disilylene, or tetramethyldisilylene group; a germanium-containing bridging group such as a dimethylgermylene, diethylgermylene, diphenylgermylene, or methylphenylgermylene group; an alkylphosphinediyl group; and an imino group. Of those, especially preferred are an alkylene group, an alkylidene group, a silicon-containing bridging group, and a germanium-containing bridging group.

In the above-mentioned formula, $R^2$ and/or $R^3$ include an optionally-substituted hydrocarbon group having from 1 to 40 carbon atoms, such as methyl, ethyl, n-propyl, isopropyl, n-butyl, isobutyl, t-butyl, n-pentyl, isopentyl, cyclopentyl, hexyl, cyclohexyl, heptyl, octyl, nonyl, decyl, phenyl, t-butylphenyl, or naphthyl group; an optionally halogen-containing hydrocarbon group having from 1 to 40 carbon atoms, such as fluoromethyl, fluoroethyl, fluorophenyl, fluoronaphthyl, fluorobiphenyl, chloromethyl, chloroethyl, chlorophenyl, chloronaphthyl, or chlorobiphenyl group; a halogen atom such as fluorine, chlorine, bromine, or iodine; an alkoxy group having from 1 to 40 carbon atoms such as methoxy, ethoxy, propoxy, or butoxy group; an aryloxy group having from 6 to 40 carbon atoms such as phenoxy, methylphenoxy, or pentamethylphenoxy group; a silicon-containing hydrocarbon group having from 1 to 40 carbon atoms such as trimethylsilyl, triethylsilyl, or triphenylsilyl group; as well as a phosphorus-containing hydrocarbon group having from 1 to 40 carbon atoms; a nitrogen-containing hydrocarbon group having from 1 to 40 carbon atoms; and a boron-containing hydrocarbon group having from 1 to 40 carbon atoms.

When the compound has multiple $R^2$ groups, then they may be the same or different. When two $R^2$ groups are on the neighboring carbon atoms of the cyclopentadienyl ring, then they may bond to each other to form a 4- to 10-membered ring to give an indenyl group, a tetrahydroindenyl group, a fluorenyl group, an octahydrofluorenyl group, an azulenyl group, or a hexahydroazulenyl group. Similarly, when the compound has multiple $R^3$ groups, then they may be the same or different.

When two $R^3$ groups are on the neighboring carbon atoms of the cyclopentadienyl ring, then they may bond to each other to form a 4- to 10-membered ring to give an indenyl group, a tetrahydroindenyl group, a fluorenyl group, an octahydrofluorenyl group, an azulenyl group, or a hexahydroazulenyl group. In the present invention, the metallocene of formula $Q(C_5H_{4-a}R^2{}_a)(C_5H_{4-b}R^3{}_b)MXY$ has a $C_1$-symmetric configuration. Accordingly, so far as the compound ensures its $C_1$-symmetric configuration, $R^2$ and $R^3$ may be the same or different.

M represents a transition metal atom selected from the Group 4 of the Periodic Table, and is preferably titanium, zirconium, or hafnium, more preferably zirconium or hafnium.

X and Y each independently represents a hydrogen atom, a halogen atom, an amino group, or a hydrocarbon, halogenohydrocarbon, oxygen-containing hydrocarbon, nitrogen-containing hydrocarbon, alkoxy, or alkylamide group having from 1 to 20, preferably from 1 to 10 carbon atoms, or a phosphorus-containing hydrocarbon or silicon-containing hydrocarbon group having from 1 to 20, preferably from 1 to 12 carbon atoms. X and Y may be the same or different. Of those, preferred are a halogen atom, a hydrocarbon group, and an alkylamide group.

When M is zirconium, examples of the transition metal compound are mentioned below.

(1) Dichloro[dimethylsilylene(cyclopentadienyl)-(2-methyl-1-indenyl)zirconium];

(2) Dichloro[dimethylsilylene(cyclopentadienyl)-(2,4-dimethyl-1-indenyl)zirconium];

(3) Dichloro[dimethylsilylene(cyclopentadienyl)-(2-methyl-4-phenyl-1-indenyl)zirconium];

(4) Dichloro[dimethylsilylene(cyclopentadienyl)-(2-methyl-4-isopropyl-1-indenyl)zirconium];

(5) Dichloro[dimethylsilylene(9-fluorenyl)-(2,4-dimethyl-1-indenyl)zirconium];

(6) Dichloro[dimethylsilylene(cyclopentadienyl)-(2-ethyl-4-methyl-1-indenyl)zirconium];

(7) Dichloro[dimethylsilylene(cyclopentadienyl)-(2-ethyl-4-phenyl-1-indenyl)zirconium];

(8) Dichloro[ethylene(cyclopentadienyl)-(2-methyl-1-indenyl)zirconium];

(9) Dichloro[ethylene(cyclopentadienyl)-(2,4-dimethyl-1-indenyl)zirconium];

(10) Dichloro[ethylene(cyclopentadienyl)-(2-methyl-4-phenyl-1-indenyl)zirconium];

(11) Dichloro[ethylene(cyclopentadienyl)-(2-methyl-4-isopropyl-1-indenyl)zirconium];

(12) Dichloro[ethylene(9-fluorenyl)-(2,4-dimethyl-1-indenyl)zirconium];

(13) Dichloro[ethylene(cyclopentadienyl)-(2-ethyl-4-methyl-1-indenyl)zirconium];

(14) Dichloro[ethylene(cyclopentadienyl)-(2-ethyl-4-phenyl-1-indenyl)zirconium];

(15) Dichloro[dimethylsilylene(cyclopentadienyl)-(2-methyltetrahydro-1-indenyl)zirconium];

(16) Dichloro[dimethylsilylene(cyclopentadienyl)-(2,4-dimethyltetrahydro-1-indenyl)zirconium];

(17) Dichloro[dimethylsilylene(cyclopentadienyl)-(2-methyl-4-phenyltetrahydro-1-indenyl)zirconium];

(18) Dichloro[dimethylsilylene(cyclopentadienyl)-(2-methyl-4-isopropyltetrahydro-1-indenyl)zirconium];

(19) Dichloro[dimethylsilylene(2-methyl-1-cyclopentadienyl)(2,4-dimethyltetrahydro-1-indenyl)-zirconium];

(20) Dichloro[dimethylsilylene(cyclopentadienyl)-(2-ethyl-4-methyltetrahydro-1-indenyl)zirconium];

(21) Dichloro[dimethylsilylene(cyclopentadienyl)-(2-ethyl-4-phenyltetrahydro-1-indenyl)zirconium];

(22) Dichloro[ethylene(cyclopentadienyl)-(2-methyltetrahydro-1-indenyl)zirconium];

(23) Dichloro[ethylene(cyclopentadienyl)-(2,4-dimethyltetrahydro-1-indenyl)zirconium];

(24) Dichloro[ethylene(cyclopentadienyl)-(2-methyl-4-phenyltetrahydro-1-indenyl)zirconium];

(25) Dichloro[ethylene(cyclopentadienyl)-(2-methyl-4-isopropyltetrahydro-1-indenyl)zirconium];

(26) Dichloro[ethylene(9-fluorenyl)-(2,4-dimethyltetrahydro-1-indenyl)zirconium];

(27) Dichloro[ethylene(cyclopentadienyl)-(2-ethyl-4-methyltetrahydro-1-indenyl)zirconium]; and

(28) Dichloro[ethylene(cyclopentadienyl)-(2-ethyl-4-phenyltetrahydro-1-indenyl)zirconium].

For other transition metal compounds of Groups 4 to 6 such as titanium compounds and hafnium compounds, there are mentioned the same type of compounds as above. Mixtures of these compounds having different structures may be used herein. Using such a mixture of compounds having different structures makes it possible to introduce a stereospecificity distribution into the block (I) in the invention. Introduction of a stereospecificity distribution is one favorable embodiment of the present invention, as it makes it possible to plan a resin that is flexible and has a relatively high melting point. In addition, a solid catalyst that comprises known titanium trichloride as the essential ingredient thereof, as well as a supported catalyst that contains magnesium, titanium, and halogen as the indispensable ingredients thereof may also be used as an auxiliary catalyst.

Transition metal compounds that are especially favorably used in the invention are $C_1$-symmetric compounds of the following formula (I):

In formula (I), $A^1$ and $A^2$ are each a different conjugated 5-membered ring ligand; and at least one of $A^1$ and $A^2$ is so constituted that the neighboring substituents on the conjugated 5-membered ring ligand bond to each other to form, together with the two atoms of the 5-membered ring, a 7- to 10-membered condensed ring; Q represents a bridging group that combines the two conjugated 5-membered ring ligands at any desired position; M represents a transition metal atom selected from Group 4 of the Periodic Table; and X and Y each independently represents, bonding to M, a hydrogen atom, a halogen atom, a hydrocarbon group, an alkylamide group, a halogenohydrocarbon group, an oxygen-containing hydrocarbon group, a nitrogen-containing hydrocarbon group, a phosphorus-containing hydrocarbon group, a silicon-containing hydrocarbon group or a sulfur-containing group.

One typical example of the conjugated 5-membered ring ligand is a substituted cyclopentadienyl group. The substituent is, for example, a hydrocarbon group generally having from 1 to 40, preferably from 1 to 20, more preferably from 1 to 15 carbon atoms. For example, it includes methyl, ethyl, n-propyl, isopropyl, n-butyl, t-butyl, isobutyl, pentyl, cyclopentyl, hexyl, cyclohexyl, octyl, phenyl, naphthyl, butenyl, butadienyl, and triphenylcarbyl groups.

Other substituents than the above-mentioned hydrocarbon group are hydrocarbon residues that contain an atom of silicon, oxygen, nitrogen, phosphorus, boron, or sulfur. Typical examples of the residues are methoxy, ethoxy, phenoxy, furyl, trimethylsilyl, diethylamino, diphenylamino, pyrazolyl, indolyl, carbazolyl, dimethylphosphino, diphenylphosphino, diphenylboryl, dimethoxyboryl, and thienyl groups.

Still other substituents are a halogen atom and a halogenohydrocarbon group. Their typical examples are chlorine, bromine, iodine, fluorine, trichloromethyl, chlorophenyl, chlorobiphenyl, chloronaphthyl, trifluoromethyl, fluorophenyl, fluorobiphenyl, fluoronaphthyl, and pentafluorophenyl groups.

As so mentioned hereinabove, at least one of $A^1$ and $A^2$ is so constituted that the neighboring substituents on the conjugated 5-membered ring ligand bond to each other to form, together with the two atoms of the 5-membered ring, a 7- to 10-membered condensed ring.

Examples of this case are azulene and the like compounds and their derivatives. More concretely, they include a hydroazulenyl group, a methylhydroazulenyl group, an ethylhydroazulenyl group, a dimethylhydroazulenyl group, a methylethylhydroazulenyl group, a methylisopropylhydroazulenyl group, a methylphenylisopropylhydroazulenyl group, hydrogenated derivatives of various azulenyl groups, a bicyclo-[6.3.0]-undecanyl group, a methyl-bicyclo-[6.3.0]-undecanyl group, an ethyl-bicyclo-[6.3.0]-undecanyl group, a phenyl-bicyclo-[6.3.0]-undecanyl group, a methylphenyl-bicyclo-[6.3.0]-undecanyl group, an ethylphenyl-bicyclo-[6.3.0]-undecanyl group, a methyldiphenyl-bicyclo-[6.3.0]-undecanyl group, a methyl-bicyclo-[6.3.0]-undecadienyl group, a methylphenyl-bicyclo-[6.3.0]-undecadienyl group, an ethylphenyl-bicyclo-[6.3.0]-undecadienyl group, a methylisopropyl-bicyclo-[6.3.0]-undecadienyl group, a bicyclo-[7.3.0]-dodecanyl group and its derivatives, a bicyclo-[7.3.0]-dodecadienyl group and its derivatives, a bicyclo-[8.3.0]-tridecanyl group and its derivatives, and a bicyclo-[8.3.0]-tridecadienyl group and its derivatives.

The substituents for these groups may be the above-mentioned hydrocarbon groups, those that contain an atom such as silicon, oxygen, nitrogen, phosphorus, boron or sulfur, as well as halogen atoms and halogenohydrocarbon groups.

Q represents a bridging group that combines the two conjugated 5-membered ring ligands at any desired position. Specifically, Q is a divalent bonding group, and thus bridges $A^1$ and $A^2$. The type of Q is not specifically limited. Concrete examples of Q include divalent hydrocarbon groups or halogenohydrocarbon groups generally having from 1 to 20, preferably from 1 to 12 carbon atoms. Concretely, Q includes an alkylene group; a cycloalkylene group; an unsaturated hydrocarbon group such as an arylene group; a haloalkylene group; a halocycloalkylene group; a silylene group or an oligosilylene group; a silylene group or an oligosilylene group substituted with a hydrocarbon or halogenohydrocarbon group having generally from 1 to 20, preferably from 1 to 12 carbon atoms; a germylene group; and a germylene group substituted with a hydrocarbon or halogenohydrocarbon group generally having from 1 to 20 carbon atoms. Of those, preferred are an alkylene group, a cycloalkylene group, an arylene group, as well as a silylene group, or germylene substituted with a hydrocarbon group.

M represents a transition metal atom selected from Group 4 of the Periodic Table, and is preferably zirconium or hafnium.

X and Y each independently represents, bonding to M, a hydrogen atom, a halogen atom, a hydrocarbon group, an alkylamide group, a halogenohydrocarbon group, an oxygen-containing hydrocarbon group, a nitrogen-containing hydrocarbon group, a phosphorus-containing hydrocarbon group, a silicon-containing hydrocarbon group, or a sulfur-containing group. The number of the carbon atoms that constitute the hydrocarbon groups is generally from 1 to 20, preferably from 1 to 12. Of those, preferred are a hydrogen atom, a chlorine atom, a methyl group, an isobutyl group, a phenyl group, a dimethylamide group, a diethylamide group, and a sulfinato group.

Specific examples of the transition metal compounds for use in the invention are mentioned below.

(29) Dichloro[dimethylsilylene(cyclopentadienyl)-(2,4-dimethyl-4H-1-azulenyl)]hafnium;
(30) Dichloro[dimethylsilylene(2-methyl-1-cyclopentadienyl)(2,4-dimethyl-4H-1-azulenyl)]hafnium;
(31) Dichloro[dimethylsilylene(cyclopentadienyl)-(2-methyl-4-phenyl-4H-1-azulenyl)]hafnium;
(32) Dichloro[dimethylsilylene(cyclopentadienyl)-(2-methyl-4-isopropyl-4H-1-azulenyl)]hafnium;
(33) Dichloro[dimethylsilylene(2-ethyl-1-cyclopentadienyl)(2,4-dimethyl-4H-1-azulenyl)]hafnium;
(34) Dichloro[dimethylsilylene(9-fluorenyl)-(2,4-dimethyl-4H-1-azulenyl)]hafnium;
(35) Dichloro[dimethylsilylene(cyclopentadienyl)-(2-ethyl-4-methyl-4H-1-azulenyl)]hafnium;
(36) Dichloro[dimethylsilylene(2-methyl-1-cyclopentadienyl)(2-ethyl-4-methyl-4H-1-azulenyl)]hafnium;
(37) Dichloro[dimethylsilylene(cyclopentadienyl)-(2-ethyl-4-phenyl-4H-1-azulenyl)]hafnium;
(38) Dichloro[dimethylsilylene(cyclopentadienyl)-(2-ethyl-4-isopropyl-4H-1-azulenyl)]hafnium;
(39) Dichloro[dimethylsilylene(9-fluorenyl)-(2-ethyl-4-methyl-4H-1-azulenyl)]hafnium;
(40) Dichloro[dimethylsilylene(2,3-dimethyl-1-cyclopentadienyl)(2-ethyl-4-methyl-4H-1-azulenyl)]hafnium;
(41) Dichloro[ethylene(cyclopentadienyl)-(2,4-dimethyl-4H-1-azulenyl)]hafnium;
(42) Dichloro[ethylene(2-methyl-1-cyclopentadienyl)-(2,4-dimethyl-4H-1-azulenyl)]hafnium;
(43) Dichloro[ethylene(cyclopentadienyl)-(2-methyl-4-phenyl-4H-1-azulenyl)]hafnium;
(44) Dichloro[ethylene(cyclopentadienyl)-(2-methyl-4-isopropyl-4H-1-azulenyl)]hafnium;
(45) Dichloro[ethylene(2-methyl-1-cyclopentadienyl)-(2,4-dimethyl-4H-1-azulenyl)]hafnium;
(46) Dichloro[ethylene(9-fluorenyl)-(2,4-dimethyl-4H-1-azulenyl)]hafnium;
(47) Dichloro[ethylene(cyclopentadienyl)-(2-ethyl-4-methyl-4H-1-azulenyl)]hafnium;
(48) Dichloro[ethylene(2-methyl-1-cyclopentadienyl)-(2-ethyl-4-methyl-4H-1-azulenyl)]hafnium;
(49) Dichloro[dimethylsilylene(2-methyl-1-cyclopentadienyl)(2-ethyl-4-phenyl-4H-1-azulenyl)]hafnium;
(50) Dichloro[dimethylsilylene(2-methyl-1-cyclopentadienyl)(2-ethyl-4-isopropyl-4H-1-azulenyl)]hafnium;
(51) Dichloro[ethylene(9-fluorenyl)-(2-ethyl-4-methyl-4H-1-azulenyl)]hafnium;
(52) Dichloro[ethylene(9-fluorenyl)-(2-ethyl-4-isopropyl-4H-1-azulenyl)]hafnium;
(53) Dichloro[dimethylsilylene(cyclopentadienyl)-(2-n-propyl-4-methyl-4H-1-azulenyl)]hafnium;
(54) Dichloro[dimethylsilylene(cyclopentadienyl)-(2-isopropyl-4-methyl-4H-1-azulenyl)]hafnium;
(55) Dichloro[dimethylsilylene(cyclopentadienyl)-(2-n-butyl-4-methyl-4H-1-azulenyl)]hafnium;
(56) Dichloro[dimethylsilylene(2-methyl-1-cyclopentadienyl)(2-n-propyl-4-methyl-4H-1-azulenyl)]hafnium;
(57) Dichloro[dimethylsilylene(2-methyl-1-cyclopentadienyl)(2-isopropyl-4-methyl-4H-1-azulenyl)]hafnium;

(58) Dichloro[dimethylsilylene(2-methyl-1-cyclopentadienyl)(2-n-butyl-4-methyl-4H-1-azulenyl)]hafnium;
(59) Dichloro[dimethylsilylene(cyclopentadienyl)-(2,4,8-trimethyl-4H-1-azulenyl)]hafnium;
(60) Dichloro[dimethylsilylene(cyclopentadienyl)-(2,4,6-trimethyl-4H-1-azulenyl)]hafnium;
(61) Dichloro[dimethylsilylene(cyclopentadienyl)-(2,4,7-trimethyl-4H-1-azulenyl)]hafnium;
(62) Dichloro[dimethylsilylene(cyclopentadienyl)-(2,4-dimethyl-6-isopropyl-4H-1-azulenyl)]hafnium;
(63) Dichloro[dimethylsilylene(cyclopentadienyl)-(2,4-dimethyl-7-isopropyl-4H-1-azulenyl)]hafnium;
(64) Dichloro[dimethylsilylene(cyclopentadienyl)-(2,4-dimethyl-8-isopropyl-4H-1-azulenyl)]hafnium;
(65) Dichloro[dimethylsilylene(cyclopentadienyl)-(2,4-dimethyl-6-ethyl-4H-1-azulenyl)]hafnium;
(66) Dichloro[dimethylsilylene(cyclopentadienyl)-(2,4-dimethyl-7-ethyl-4H-1-azulenyl)]hafnium;
(67) Dichloro[dimethylsilylene(cyclopentadienyl)-(2,4-dimethyl-8-ethyl-4H-1-azulenyl)]hafnium;
(68) Dichloro{[di(chloromethyl)silylene](cyclopentadienyl)-(2,4-dimethyl-4H-1-azulenyl)}hafnium;
(69) Dichloro{[di(4-chlorophenyl)silylene]-(cyclopentadienyl)(2,4-dimethyl-4H-1-azulenyl)}hafnium;
(70) Dichloro[dimethylmethylene(cyclopentadienyl)-(2,4-dimethyl-4H-1-azulenyl)]hafnium;
(71) Dichloro[dimethylgermylene(cyclopentadienyl)-(2,4-dimethyl-4H-1-azulenyl)]hafnium;
(72) Dichloro[dimethylgermylene(2-methyl-1-cyclopentadienyl)(2,4-dimethyl-4H-1-azulenyl)]hafnium;
(73) Dichloro[dimethylgermylene(2,3-dimethyl-1-cyclopentadienyl)(2,4-dimethyl-4H-1-azulenyl)]hafnium;
(74) Dichloro[dimethylgermylene(9-fluorenyl)-(2,4-dimethyl-4H-1-azulenyl)]hafnium;
(75) Dichloro[dimethylgermylene(cyclopentadienyl)-(2-ethyl-4-methyl-4H-1-azulenyl)]hafnium;
(76) Dichloro[dimethylgermylene(cyclopentadienyl)-(2-n-propyl-4-methyl-4H-1-azulenyl)]hafnium;
(77) Dichloro[dimethylgermylene(cyclopentadienyl)-(2-isopropyl-4H-1-azulenyl)]hafnium;
(78) Dichloro[dimethylgermylene(cyclopentadienyl)-(2-n-butyl-4-methyl-4H-1-azulenyl)]hafnium;
(79) Dichloro[dimethylgermylene(2-methyl-1-cyclopentadienyl)(2-ethyl-4-methyl-4H-1-azulenyl)]hafnium;
(80) Dichloro[dimethylgermylene(2,3-dimethyl-1-cyclopentadienyl)(2-ethyl-4-methyl-4H-1-azulenyl)]hafnium;
(81) Dichloro[dimethylgermylene(9-fluorenyl)-(2-ethyl-4-methyl-4H-1-azulenyl)]hafnium;
(82) Dichloro[dimethylgermylene(2-methyl-1-cyclopentadienyl)(2-n-propyl-4-methyl-4H-1-azulenyl)]hafnium;
(83) Dichloro[dimethylgermylene(2,3-dimethyl-1-cyclopentadienyl)(2-n-propyl-4-methyl-4H-1-azulenyl)]hafnium;
(84) Dichloro[dimethylgermylene(9-fluorenyl)-(2-n-propyl-4-methyl-4H-1-azulenyl)]hafnium;
(85) Dichloro[dimethylsilylene(3-trimethylsilyl-1-cyclopentadienyl)(2,4-dimethyl-4H-1-azulenyl)]hafnium;
(86) Dichloro[dimethylsilylene(3-trimethylsilyl-1-cyclopentadienyl)(2-ethyl-4-methyl-4H-1-azulenyl)]hafnium;
(87) Dichloro[dimethylgermylene(3-trimethylsilyl-1-cyclopentadienyl)(2,4-dimethyl-4H-1-azulenyl)]hafnium;
(88) Dichloro[dimethylgermylene(3-trimethylsilyl-1-cyclopentadienyl)(2-ethyl-4-methyl-4H-1-azulenyl)]hafnium;
(89) Dibromo[dimethylsilylene(cyclopentadienyl)-(2,4-dimethyl-4H-1-azulenyl)]hafnium;
(90) Dibromo[dimethylsilylene(2-methyl-1-cyclopentadienyl)-(2,4-dimethyl-4H-1-azulenyl)]hafnium;
(91) Dibromo[dimethylsilylene(2,3-dimethyl-1-cyclopentadienyl)(2,4-dimethyl-4H-1-azulenyl)]hafnium;
(92) Dibromo[dimethylsilylene(9-fluorenyl)-(2,4-dimethyl-4H-1-azulenyl)]hafnium;
(93) Diiodo[dimethylsilylene(cyclopentadienyl)-(2,4-dimethyl-4H-1-azulenyl)]hafnium;
(94) Diiodo[dimethylsilylene(2-methyl-1-cyclopentadienyl)-(2,4-dimethyl-4H-1-azulenyl)]hafnium;
(95) Diiodo[dimethylsilylene(2,3-dimethyl-1-cyclopentadienyl)(2,4-dimethyl-4H-1-azulenyl)]hafnium;
(96) Diiodo[dimethylsilylene(9-fluorenyl)-(2,4-dimethyl-4H-1-azulenyl)]hafnium;
(97) Dimethyl[dimethylsilylene(cyclopentadienyl)-(2,4-dimethyl-4H-1-azulenyl)]hafnium;
(98) Dimethyl[dimethylsilylene(2-methyl-1-cyclopentadienyl)(2,4-dimethyl-4H-1-azulenyl)]hafnium;
(99) Dimethyl[dimethylsilylene(2,3-dimethyl-1-cyclopentadienyl)(2,4-dimethyl-4H-1-azulenyl)]hafnium;
(100) Dimethyl[dimethylsilylene(9-fluorenyl)-(2,4-dimethyl-4H-1-azulenyl)]hafnium;
(101) Dihydrido[dimethylsilylene(cyclopentadienyl)-(2,4-dimethyl-4H-1-azulenyl)]hafnium;
(102) Dihydrido[dimethylsilylene(2-methyl-1-cyclopentadienyl)(2,4-dimethyl-4H-1-azulenyl)]hafnium;
(103) Dihydrido[dimethylsilylene(2,3-dimethyl-1-cyclopentadienyl)(2,4-dimethyl-4H-1-azulenyl)]hafnium;
(104) Dihydrido[dimethylsilylene(9-fluorenyl)-(2,4-dimethyl-4H-1-azulenyl)]hafnium;
(105) Bis(dimethylamido)[dimethylsilylene-(cyclopentadienyl)(2,4-dimethyl-4H-1-azulenyl)]hafnium;
(106) Bis(dimethylamido)[dimethylsilylene(2-methyl-1-cyclopentadienyl)(2,4-dimethyl-4H-1-azulenyl)]hafnium;
(107) Bis(dimethylamido)[dimethylsilylene(2,3-dimethyl-1-cyclopentadienyl)(2,4-dimethyl-4H-1-azulenyl)]hafnium;
(108) Bis(dimethylamido)[dimethylsilylene(9-fluorenyl)-(2,4-dimethyl-4H-1-azulenyl)]hafnium;
(109) Bisphenoxy[dimethylsilylene(cyclopentadienyl)-(2,4-dimethyl-4H-1-azulenyl)]hafnium;
(110) Bisphenoxy[dimethylsilylene(2-methyl-1-cyclopentadienyl)(2,4-dimethyl-4H-1-azulenyl)]hafnium;
(111) Bisphenoxy[dimethylsilylene(2,3-dimethyl-1-cyclopentadienyl)(2,4-dimethyl-4H-1-azulenyl)]hafnium;
(112) Bisphenoxy[dimethylsilylene(9-fluorenyl)-(2,4-dimethyl-4H-1-azulenyl)]hafnium;
(113) Bismethanesulfinato[dimethylsilylene-(cyclopentadienyl)(2,4-dimethyl-4H-1-azulenyl)]hafnium;
(114) Bismethanesulfinato[dimethylsilylene(2-methyl-1-cyclopentadienyl)(2,4-dimethyl-4H-1-azulenyl)]hafnium;
(115) Bismethanesulfinato[dimethylsilylene(2,3-dimethyl-1-cyclopentadienyl)(2,4-dimethyl-4H-1-azulenyl)]hafnium;
(116) Bismethanesulfinato[dimethylsilylene(9-fluorenyl)-(2,4-dimethyl-4H-1-azulenyl)]hafnium;
(117) Bistrifluoromethanesulfinato[dimethylsilylene-(cyclopentadienyl)(2,4-dimethyl-4H-1-azulenyl)]hafnium;
(118) Bistrifluoromethanesulfinato[dimethylsilylene-(2-methyl-1-cyclopentadienyl)(2,4-dimethyl-4H-1-azulenyl)]hafnium;
(119) Bistrifluoromethanesulfinato[dimethylsilylene(2,3-dimethyl-1-cyclopentadienyl)(2,4-dimethyl-4H-1-azulenyl)]hafnium;
(120) Bistrifluoromethanesulfinato[dimethylsilylene(9-fluorenyl)(2,4-dimethyl-4H-1-azulenyl)]hafnium;
(121) Bis-p-toluenesulfinato[dimethylsilylene-(cyclopentadienyl)(2,4-dimethyl-4H-1-azulenyl)]hafnium;

(122) Bis-p-toluenesulfinato[dimethylsilylene-(2-methyl-1-cyclopentadienyl)(2,4-dimethyl-4H-1-azulenyl)]hafnium;

(123) Bis-p-toluenesulfinato[dimethylsilylene(2,3-diethyl-1-cyclopentadienyl)(2,4-dimethyl-4H-1-azulenyl)]hafnium;

(124) Bis-p-toluenesulfinato[dimethylsilylene(9-fluorenyl)(2,4-dimethyl-4H-1-azulenyl)]hafnium;

(125) Dichloro[dimethylsilylene(1-indenyl)-(2,4-dimethyl-4H-1-azulenyl)]hafnium;

(126) Dichloro[dimethylsilylene(2-methyl-1-indenyl)-(2,4-dimethyl-4H-1-azulenyl)]hafnium;

(127) Dichloro[dimethylsilylene(1-indenyl)-(2-ethyl-4-methyl-4H-1-azulenyl)]hafnium;

(128) Dichloro[dimethylsilylene(2-methyl-1-indenyl)-(2-ethyl-4-methyl-4H-1-azulenyl)]hafnium;

(129) Dibromo[dimethylsilylene(1-indenyl)-(2,4-dimethyl-4H-1-azulenyl)]hafnium;

(130) Dibromo[dimethylsilylene(2-methyl-1-indenyl)-(2,4-dimethyl-4H-1-azulenyl)]hafnium;

(131) Dibromo[dimethylsilylene(1-indenyl)-(2-ethyl-4-methyl-4H-1-azulenyl)]hafnium;

(132) Dibromo[dimethylsilylene(2-methyl-1-indenyl)-(2-ethyl-4-methyl-4H-1-azulenyl)]hafnium;

(133) Diiodo[dimethylsilylene(1-indenyl)-(2,4-dimethyl-4H-1-azulenyl)]hafnium;

(134) Diiodo[dimethylsilylene(2-methyl-1-indenyl)-(2,4-dimethyl-4H-1-azulenyl)]hafnium;

(135) Diiodo[dimethylsilylene(1-indenyl)-(2-ethyl-4-methyl-4H-1-azulenyl)]hafnium;

(136) Diiodo[dimethylsilylene(2-methyl-1-indenyl)-(2-ethyl-4-methyl-4H-1-azulenyl)]hafnium;

(137) Dimethyl[dimethylsilylene(1-indenyl)-(2,4-dimethyl-4H-1-azulenyl)]hafnium;

(138) Dimethyl[dimethylsilylene(2-methyl-1-indenyl)-(2,4-dimethyl-4H-1-azulenyl)]hafnium;

(139) Dimethyl[dimethylsilylene(1-indenyl)-(2-ethyl-4-methyl-4H-1-azulenyl)]hafnium;

(140) Dimethyl[dimethylsilylene(2-methyl-1-indenyl)-(2-ethyl-4-methyl-4H-1-azulenyl)]hafnium;

(141) Dichloro[dimethylsilylene(cyclopentadienyl)-(2,4-dimethyl-4H-5,6,7,8-tetrahydro-1-azulenyl)]hafnium;

(142) Dichloro[dimethylsilylene(2-methyl-1-cyclopentadienyl)(2,4-dimethyl-4H-5,6,7,8-tetrahydro-1-azulenyl)]hafnium;

(143) Dichloro[dimethylsilylene(2-methyl-1-indenyl)-(2,4-dimethyl-4H-5,6,7,8-tetrahydro-1-azulenyl)]hafnium;

(144) Dichloro[dimethylsilylene(9-fluorenyl)-(2,4-dimethyl-4H-5,6,7,8-tetrahydro-1-azulenyl)]hafnium;

(145) Dichloro[dimethylsilylene(cyclopentadienyl)-(2-chloromethyl-4-methyl-4H-1-azulenyl)]hafnium;

(146) Dichloro[dimethylsilylene(cyclopentadienyl)-(2-methyl-4-chloromethyl-4H-1-azulenyl)]hafnium;

(147) Dichloro[dimethylsilylene(2-methyl-1-indenyl)-(2-methyl-4-phenyl-4H-1-azulenyl)]hafnium;

(148) Dichloro[dimethylsilylene(2-methyl-1-indenyl)-(2-methyl-4-isopropyl-4H-1-azulenyl)]hafnium;

(149) Dichloro[dimethylsilylene(2-methyl-1-indenyl)-(2-methyl-4-isobutyl-4H-1-azulenyl)]hafnium;

(150) Dichloro[dimethylsilylene(1,2,3,4,5,6,7,8-octahydro-9-fluorenyl)(2-methyl-4-phenyl-4H-1-azulenyl)]hafnium;

(151) Dichloro[dimethylsilylene(1,2,3,4,5,6,7,8-octahydro-9-fluorenyl)(2-methyl-4-isobutyl-4H-1-azulenyl)]hafnium;

(152) Dichloro[dimethylsilylene(1,2,3,4,5,6,7,8-octahydro-9-fluorenyl)(2-methyl-4-isopropyl-4H-1-azulenyl)]hafnium;

(153) Dichloro[dimethylsilylene(2-methyl-1-indenyl)-(2-methyl-4-phenyl-4H-1-azulenyl)]hafnium;

(154) Dichloro[dimethylsilylene(2-methyl-1-indenyl)-(2-methyl-4-(4-t-butylphenyl)-4H-1-azulenyl)]hafnium;

(155) Dichloro[dimethylsilylene(2-methyl-1-indenyl)-(2,4-dimethyl-4H-1-azulenyl)]hafnium;

(156) Dichloro[dimethylsilylene(2-methylbenzo[e]indenyl)-(2-methyl-4-phenyl-4H-1-azulenyl)]hafnium;

(157) Dichloro[dimethylsilylene(2-methylbenzo[e]indenyl)-(2,4-dimethyl-4H-1-azulenyl)]hafnium; and (158) Dichloro[dimethylsilylene(2-methyl-5,6-cyclotrimethylene-1-indenyl)-(2-methyl-4-phenyl-4H-1-azulenyl)]hafnium.

In those compounds shown above, the center atom M, hafnium may be replaced with titanium or zirconium, and the use of the corresponding compounds are also included herein. Two or more of these compounds may be combined for use herein. When the polymerization is attained in multiple stages, a fresh transition metal component may be added to the reaction system after the first-stage polymerization or before the start of the second-stage polymerization. When a mixture of two or more compounds having different structures is used, then a stereospecificity distribution may be introduced into the block (I) in the invention, as so mentioned hereinabove. Introduction of a stereospecificity distribution is one favorable embodiment of the present invention, as it makes it possible to plan a resin that is flexible and has a relatively high melting point.

Catalyst Component (B): Cocatalyst

The component (B), cocatalyst for use in the present invention contains, as the indispensable component thereof, at least one substance selected from (1) an organoaluminumoxy compound, (2) an ionic compound capable of reacting with the component (A) to thereby convert the component (A) into its cation, (3) a Lewis acid, and (4) an ion-exchangeable layered compound except silicates, or an inorganic silicate.

(B)-(1) Organoaluminumoxy Compound:

Concretely, the organoaluminumoxy compound includes compounds of the following formulae (II), (III) and (IV):

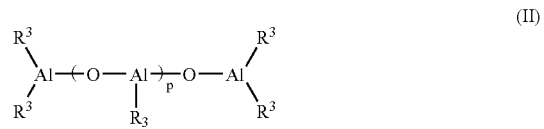

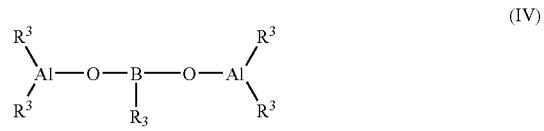

In these formulae, $R^3$ represents a hydrogen atom or a hydrocarbon residue, and is preferably a hydrocarbon residue having from 1 to 10, more preferably from 1 to 6 carbon atoms. Multiple $R^3$ groups may be the same or different. p indicates an integer of from 0 to 40, preferably from 2 to 30.

Compounds of formulae (II) and (III) are referred to as aluminoxanes, and they are produced by reacting one or more different types of trialkylaluminums with water. Concretely, they include (a) methylaluminoxane, ethylaluminoxane, propylaluminoxane, butylaluminoxane, and isobutylaluminoxane that are obtained through reaction of one trialkylaluminum with water; and (b) methylethylaluminoxane, methylbutylaluminoxane, and methylisobutylaluminoxane that are obtained through reaction of two trialkylaluminums with water. Of those, preferred are methylaluminoxane and methylisobutylaluminoxane. Different types of aluminoxanes may be used herein, as combined. These aluminoxanes may be produced under various conditions.

Compounds of formula (IV) are obtained by reacting one or more different types of trialkylaluminums with an alkylboric acid of the following formula (V) in a ratio falling between 10/1 and 1/1 (by mol). In formula (V), $R^4$ represents a hydrocarbon residue or halogenohydrocarbon group having from 1 to 10, preferably from 1 to 6 carbon atoms.

$$R^4\text{—}B(OH)_2 \quad (V)$$

Concretely, the compounds include the following reaction products: (a) 2/1 reaction product of trimethylaluminum and methylboric acid; (b) 2/1 reaction product of triisobutylaluminum and methylboric acid; (c) 1/1/1 reaction product of trimethylaluminum, triisobutylaluminium and methylboric acid; (d) 2/1 reaction product of trimethylaluminum and ethylboric acid; (e) 2/1 reaction product of triethylaluminum and butylboric acid.

(B)-2: An Ionic Compound Capable of Reacting with the Component (A) to Convert Component (A) into its Cation The ionic compound capable of reacting with the component (A) to convert component (A) into its cation includes compounds of the following formula (VI).

$$[K]^{n+}[Z]^{n-} \quad (VI)$$

In formula (VI), K represents a cation component, including, for example, carbonium cations, tropylium cations, ammonium cations, oxonium cations, sulfonium cations, and phosphonium cations. In addition, it further includes cations of metals or organic metals that are readily reduced by themselves.

Examples of the cation are triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tris(dimethylphenyl)phosphonium, tris(dimethylphenyl)phosphonium, tris(methylphenyl)phosphonium, triphenylsulfonium, triphenylsulfonium, triphenyloxonium, triethyloxonium, pyrylium, silver ion, gold ion, platinum ion, copper ion, palladium ion, mercury ion, and ferrocenium ion.

In formula (VI), Z is an anion component, and it provides a counter anion to the cation converted from a component (A) (in general, this is a non-coordinated component). Z includes, for example, organoboron compound anions, organoaluminum compound anions, organogallium compound anions, organoarsenic compound anions, and organoantimony compound anions. Concretely, Z includes the following compounds: (a) tetraphenylboron, tetrakis(3,4,5-trifluorophenyl)boron, tetrakis{3,5-bis(trifluoromethyl)phenyl}boron, tetrakis{3,5-di(t-butyl)phenyl}boron, tetrakis(pentafluorophenyl)boron; (b) tetraphenylaluminum, tetrakis(3,4,5-trifluorophenyl)aluminum, tetrakis{3,5-bis(trifluuoromethyl)phenyl}aluminum, tetrakis{3,5-di-(t-butyl)phenyl}aluminum, tetrakis(pentafluorophenyl)aluminum; (c) tetraphenylgallium, tetrakis(3,4,5-trifluorophenyl)gallium, tetrakis{3,5-dib(trifluoromethyl)phenyl}gallium, tetrakis{3,5-di(t-butyl)phenyl}gallium, tetrakis(pentafluorophenyl)gallium; (d) tetraphenylphosphorus, tetrakis(pentafluorophenyl)phosphorus; (e) tetraphenylarsenic, tetrakis(pentafluorophenyl)arsenic; (f) tetraphenylantimony, tetrakis(pentafluorophenyl)antimony; (g) decaborate, undecaborate, carbadodecaborate, decachlorodecaborate.

(B)-3: Lewis Acid

The Lewis acid, especially that capable of converting the component (A) into its cation includes various organoboron compounds, metal halide compounds and solid acids. Examples include (a) an organoboron compound such as triphenylboron, tris(3,5-difluorophenyl)boron, tris(pentafluorophenyl)boron; (b) a metal halide such as aluminum chloride, aluminum bromide, aluminum iodide, magnesium chloride, magnesium bromide, magnesium iodide, magnesium chlorobromide, magnesium chloroiodide, magnesium bromoiodide, magnesium chloride hydride, magnesium chloride hydroxide, magnesium bromide hydroxide, magnesium chloride alkoxide, magnesium bromide alkoxide; and (c) a solid acid such as alumina, silica/alumina.

(B)-4: Ion-Exchangeable Layered Compound Except Silicates, or Organic Silicate

The ion-exchangeable layered compound except silicates is a compound having a crystal structure in which the faces formed by ionic bonding are layered in parallel while bonding to each other with a weak bonding force and in which the ion is exchangeable.

The ion-exchangeable layered compound except silicates is, for example, an ion-crystalline compound having a layered crystal structure such as a hexagonal close packing-type structure, an antimony-type structure, a $CdCl_2$-type structure of a $CdI_2$-type structure. Concretely, it includes various crystalline acidic salts of polyvalent metals such as $\alpha\text{-}Zr(HAsO_4)_2.H_2O$, $\alpha\text{-}Zr(HPO_4)_2$, $\alpha\text{-}Zr(KPO_4)_2.3H_2O$, $\alpha\text{-}Ti(HPO_4)_2$, $\alpha\text{-}Ti(HAsO_4)_2.H_2O$, $\alpha\text{-}Sn(HPO_4)_2.H_2O$, $\gamma\text{-}Zr(HPO_4)_2$, $\gamma\text{-}Ti(HPO_4)_2$, $\gamma\text{-}Ti(NH_4PO_4)_2.H_2O$.

The inorganic silicate includes clay, clay minerals, zeolite, and diatomaceous earth. These may be synthetic products, or natural minerals.

Examples of clay and clay minerals are allophane group minerals such as allophane; kaolin group minerals such as dickite, nacrite, kaolinite, anoxite; halloysite group minerals such as metahalloysite, halloysite; serpentine group minerals such as chrysotile, lizardite, antigorite; smectite group minerals such as montmorillonite, sauconite, beidellite, nontronite, saponite, hectorite; vermiculite group minerals such as vermiculite; mica group minerals such as illite, sericite, glauconite; as well as attapulgite, sepiolite, palygorskite, kibushi clay, gairome clay, hisingerite, pyrophyllite, chlorite. These may form a mixed layer.

Artificial synthetic products are synthetic mica, synthetic hectorite, synthetic saponite, synthetic teniolite.

Of those examples, preferred are kaolin group minerals such as dickite, nacrite, kaolinite, anoxite; halloysite group minerals such as metahalloysite, halloysite; serpentine group minerals such as chrysotile, lizardite, antigorite; smectite group minerals such as montmorillonite, sauconite, beidellite, nontronite, saponite, hectorite; vermiculite group minerals such as vermiculite; mica group minerals such as illite, sericite, glauconite; and synthetic mica; synthetic hectorite; synthetic saponite; and synthetic teniolite. More preferred are smectite group minerals such as montmorillonite, sauconite, beidellite, nontronite, saponite, hectorite; vermiculite group minerals such as vermiculite; and synthetic mica; synthetic hectorite; synthetic saponite; and synthetic teniolite.

These ion-exchangeable layered compounds except silicates, and inorganic silicates may be used directly as they are, but are preferably processed with acids such as hydrochloric acid, nitric acid or sulfuric acid, and/or with salts such as LiCl, NaCl, KCl, CaCl$_2$, MgCl$_2$, Li$_2$SO$_4$, MgSO$_4$, ZnSO$_4$, Ti(SO$_4$)$_2$, Zr(SO$_4$)$_2$, or Al$_2$(SO$_4$)$_3$, before they are used.

In processing them, the corresponding acid and base may be mixed in a reaction system to form a salt with which they may be processed. If desired, they may be ground or granulated for morphology control. For producing block copolymers having good particle properties, it is desirable that the compounds are granulated. In addition, the above-mentioned components are generally dehydrated and dried before they are used. In view of the particle properties of the block copolymer to be obtained and of the polymerization activity of the catalyst, the component (B)-4, ion-exchangeable layered compound except silicates, or inorganic silicate is preferred for the indispensable ingredient of the component (B).

Catalyst Component (C): Organoaluminum Compound

The catalyst component (C) is an optional ingredient, organoaluminum compound that is optionally combined with the catalyst component (B). The organoaluminum compound is represented by formula AlR$^1{}_m$Z$_{3-m}$ (in which R$^1$ represents a hydrocarbon group having from 1 to 20 carbon atoms; and Z represents a hydrogen atom, a halogen atom, an alkoxy group or an aryloxy group; and m indicates a number of 0<m≦3). Concretely, it includes a trialkylaluminum such as trimethylaluminum, triethylaluminum, tripropylaluminum, triisobutylaluminum; a halogen or alkoxy-containing alkylaluminum such as diethylaluminum monochloride, diethylaluminum ethoxide; and a hydrogen-containing organoaluminum compound such as diethylaluminum hydride, diisobutylaluminum hydride. In addition to these, aluminoxanes such as methylaluminoxane are also usable. Of those, especially preferred is a trialkylaluminum. Two or more these optional ingredients may be combined for use herein. If desired, the optional ingredient (C) may be additionally fed into the reaction system after the start or finish of the first-stage polymerization, or before or after the start of the second-stage polymerization.

The metallocene catalyst that is preferred for use in the invention may be prepared by contacting the catalyst component (A) and the catalyst component (B) and optionally the catalyst component (C), and the method of contacting them is not specifically limited. Contacting them may be effected not only in preparing the catalyst but also in prepolymerization with an α-olefin or polymerization of an α-olefin.

While or after the catalyst components are contacted with each other, a polymer such as polyethylene or polypropylene, or a solid of an inorganic oxide such as silica or alumina may be present in the reaction system or may be contacted with the catalyst components.

Contacting the catalyst components may be effected in an inert gas such as nitrogen and in an inert hydrocarbon solvent such as pentane, hexane, heptane, toluene, or xylene. Preferably, the solvent is pre-treated for removing poisoning substances such as water or sulfur compounds. The temperature at which the components are contacted may fall between −20° C. and the boiling point of the solvent used, preferably between room temperature and the boiling point of the solvent used.

The amount of the catalyst components is now described. When an ion-exchangeable layered compound except silicates, or an inorganic silicate is used for the catalyst component (B), then the amount of the catalyst component (A) may be from 0.0001 to 10 mmols, preferably from 0.001 to 5 mmols, and that of the catalyst component (C) may be from 0 to 10,000 mmols, preferably from 0.01 to 100 mmols, per gram of the catalyst component (B). The atomic ratio of the transition metal in the catalyst component (A) to aluminum in the catalyst component (C) may fall between 1/0 and 1/1,000,000, preferably between 1/0.1 and 1/100,000.

Thus produced, the catalyst may be or may not be washed with an inert hydrocarbon solvent such as pentane, hexane, heptane, toluene, or xylene.

In washing it, if desired, the component (C) may be additionally combined with it. In this case, the amount of the component (C) to be added is preferably such that the atomic ratio of aluminum in the component (C) to the transition metal in the component (A) falls between 1/0 and 1/10,000.

For the catalyst, also usable is a prepolymer of an α-olefin such as ethylene, propylene, 1-butene, 1-hexene, 1-octene, 4-methyl-1-pentene, 3-methyl-1-butene, vinylcycloalkane, or styrene. If desired, the prepolymer may be optionally washed. The prepolymerization may be effected in an inert gas such as nitrogen and in an inert hydrocarbon solvent such as pentane, hexane, heptane, toluene, or xylene, or may also be effected in liquid propylene.

Method of Producing Block (II)

The method of producing the block (II) is not specifically limited, any conventional method may be used. For example, propylene and ethylene, and optionally an α-olefin having from 4 to 20 carbon atoms are copolymerized in the presence of a titanium trichloride catalyst or a magnesium chloride-supported titanium-based catalyst.

One preferred embodiment of the invention is a method of copolymerizing propylene and ethylene and optionally an α-olefin having from 4 to 20 carbon atoms, in the presence of the polymer formed in the first stage and without inactivating at least a part of the catalyst used in the first stage,. After the first-stage and the second-stage polymerization, the system may be subjected to additional polymerization of a third and the latter stages. The polymerization may be effected in the presence or absence of an inert hydrocarbon such as propane, butane, hexane, heptane, or toluene, or a liquid such as liquefied α-olefin. Solution polymerization may also be employed herein, in which the polymer formed dissolves in the solvent used. Of such various methods, preferred is the method of attaining the polymerization substantially in the absence of a solvent. The catalyst is preferably a single-site catalyst.

In the present invention, the polymerization condition is controlled so that the total amount of ethylene and the optional α-olefin having from 4 to 20 carbon atoms to constitute the copolymer could be from 0.1 to 40 mol %, preferably from 5 to 40 mol %, based on the total monomer units in block (II). In general, this requirement may be satisfied by suitably controlling the ratio of propylene to the comonomer ethylene and the optional α-olefin having from 4 to 20 carbon atoms that are fed to the polymerization reactor.

Regarding the amount of the polymer to be formed in the second stage, and the total amount of all the polymers to be formed in the second and the latter stages when the third stage the latter stages are additionally carried out after the second stage, the polymerization temperature and the polymerization time are suitably so designed that the total amount of the polymer(s) may be generally from 5 to 95% by weight, preferably from 15 to 80% by weight, more preferably from 20 to 70% by weight. The polymerization temperature generally falls between 0 and 100° C., preferably between 20 and 90° C.

In another embodiment, the present invention provides soft propylene-based resin compositions which satisfy the following conditions (a) to (d):

(a): the tensile modulus thereof, measured according to JIS K 7113, is from 10 MPa to 300 MPa;

(b): the internal parallel light transmittance through it, measured according to JIS K 7105, is from 70% to 100%;

(c): the peak top temperature in the melting point profile thereof, measured through DSC, is in the range of from 100° C. to 165° C.;

(d): it substantially comprises soft propylene-based resin particles having bulk density, measured according to JIS K 7365, of at least 0.3 g/cm$^3$.

These conditions are described below.

Condition (a) relates to the flexibility of the resin composition, indicating that the composition of the invention is flexible.

Concretely, the tensile modulus defined by this condition is determined according to the method mentioned below. A number 2-type test piece defined in JIS K 7113 is blanked out of a press sheet having a thickness of 2 mm and a square size of 200 mm×200 mm. The tongue of the test piece is fixed to the chuck of a test machine (Shimadzu's AG2000). An elongation meter is fitted to the test piece, and the tensile rate is set at 50 mm/min. With that, the machine is driven, and the load-elongation curve is recorded continuously or intermittently at suitable mean strain intervals until the strain of the test piece reaches a predetermined level in the range of elastic deformation. The tensile modulus of the thus-analyzed sample is calculated according to the following formula:

$$Em = \Delta\sigma/\Delta\epsilon$$

wherein Em indicates the tensile modulus (MPa) of the analyzed sample; $\Delta\sigma$ indicates the stress difference between two points on a straight line, relative to the original mean cross section of the sample; and $\Delta\epsilon$ indicates the strain difference between the two points.

The tensile modulus is at least 10 MPa, preferably at least 15 MPa, more preferably at least 20 MPa, and is at most 300 MPa, preferably at most 250 MPa, more preferably at most 200 MPa.

If the tensile modulus thereof is smaller than 10 MPa, the resin composition is unfavorable since it is too flexible and its heat resistance is not good as the crystalline component in the composition is not enough. On the other hand, if the tensile modulus thereof is larger than 300 MPa, the resin composition is also unfavorable since its flexibility is not enough and, in addition, its crystallinity is too high and its transparency is low.

The condition (b) relates to the transparency of the resin composition, indicating that the composition of the invention is transparent.

Concretely, the light transmittance through the resin composition is determined according to the method mentioned below. A test piece having a square size of 50 mm×50 mm is prepared. A standard white plate is attached to it. The indication of a device (Nippon Denshoku Kogyo's ND-1001DP) is adjusted to 100 ($T_1$), and the quantity of incident light it is controlled. With the standard white plate attached thereto, the test piece is fitted to the device, and the whole light transmittance ($T_2$) through it is measured. The standard white plate and the test piece are removed, and a light trap is fitted to the device, and the quantity of the scattering light ($T_3$) from the device is measured. With the light trap still mounted thereon, the test piece is again fitted to the device, and the quantity of the scattering light ($T_4$) from the device and the test piece is measured. The light transmittance through the test piece is calculated according to the following formula:

$$T_p = T_2 - (T_4 - T_3)(T_2/100)$$

wherein $T_p$ indicates the parallel light transmittance (%) through the analyzed sample.

The internal parallel light transmittance is at least 70%, preferably at least 75%, more preferably at least 80%.

If the internal parallel light transmittance is smaller than 70%, then the transparency of the resin composition is not enough and is therefore unfavorable in the present invention, since the resin composition can not be substituted for flexible vinyl chloride-based resin as one application of the present invention.

The condition (c) relates to the heat resistance of the resin composition, indicating that the composition of the invention is resistant to heat.

The melting point peak top temperature in DSC is determined according to the method mentioned below, using a thermal analyzer system, DuPont's TA2000. A sample (about 5 to 10 mg) is melted at 200° C. for 3 minutes, then cooled to 30° C. at a cooling rate of 10° C./min and again heated up to 200° C. at a heating rate of 10° C./min to obtain a melting curve profile of the sample. The main endothermic peak top temperature in the last heating stage is read, and this is the melting point of the sample analyzed.

The melting point peak top temperature is not lower than 100° C., preferably not lower than 120° C., more preferably not lower than 140° C., but is not higher than 165° C., preferably not higher than 162° C., more preferably not higher than 160° C.

If the melting point peak top temperature thereof is lower than 100° C., then the resin composition is unfavorable since its heat resistance is poor and the resin composition is unsuitable for applications involving exposure to heat. On the other hand, if the melting point peak top temperature thereof is higher than 165° C., then the resin composition is unfavorable since it may lose flexibility and its transparency may be low.

The condition (d) indicates that the composition of the present invention comprises a particulate resin. This indicates that the composition of the present invention is not sticky and is favorable for industrial production and practical applications.

Concretely, the bulk density of the resin composition is measured according to the method mentioned below. A funnel shown in FIG. 1 in JIS K 7365 is prepared, and this is vertically held above a cylinder (receiver: volume, 100 ml±0.5 ml, inner diameter, 45 ml±5 mm) in such a manner that the distance between the lower opening of the funnel and the top of the cylinder could be 20 to 30 mm and that the axes of the two could correspond to each other. The damper of the lower opening of the funnel is closed, and 110 to 120 ml of a well-mixed sample is put into the funnel. The damper is immediately removed and the sample is led down into the receiver. When the receiver is filled up, the sample swelling up from the receiver is cut off by the use of a straight plate. The mass of the contents of the receiver is weighed with a weighing meter to the level of 0.1 g. The apparent density (g/cm$^3$) of the sample is calculated according to the following formula:

$$m/V$$

wherein m indicates the mass (g) of the contents of the receiver; and V indicates the receiver volume (cm$^3$), or that is, this is 100 cm$^3$.

The bulk density is at least 0.3 g/cm$^3$, preferably at least 0.32 g/cm$^3$, more preferably at least 0.35 g/cm$^3$, and is generally at most 0.5 g/cm$^3$, preferably at most 0.48 g/cm$^3$, more preferably at most 0.46 g/cm$^3$.

If the bulk density is smaller than 0.3 g/cm$^3$, then it is unfavorable since the flowability of the particles in producing the resin composition of the present invention by gas-phase two-stage polymerization is not good and the amount of the particles that may remain in the reactor will decrease, and therefore, the productivity is low. On the other hand, if the bulk density is larger than 0.5 g/cm$^3$, then it is also unfavorable since the particles will be too densely packed in the reactor and they may not be well mixed with gas while produced by gas-phase polymerization.

By satisfying the conditions (a) to (d) as above, the soft polypropylene-based resin composition of the present invention has good flexibility, transparency, and heat resistance and is not so sticky.

The method for producing the composition that satisfies these conditions is not specifically defined. In one embodiment, the composition that comprises the above-mentioned block (I) and block (II) is produced by gas-phase two-stage polymerization. The gas-phase polymerization method comprises a first stage polymerization to form the block (I) followed by a second stage polymerization to form the block (II). As mentioned hereinabove, the soft polypropylene-based resin composition is not so sticky.

Therefore, the present invention has made it possible to carry out gas-phase polymerization to give a resin composition that falls within a range of low tensile modulus, which, however, has heretofore been difficult. In general, gas-phase polymerization enjoys good productivity and is inexpensive, and therefore its industrial benefits are extremely great.

The method of gas-phase two-stage polymerization to be effected herein is not specifically limited. For example, the following methods may be employed: (1) a method of stepwise producing the block (I) and the block (II) in one polymerization reactor; and (2) a method of using a series of two polymerization reactors in which the block (I) is formed in the first polymerization reactor and the block (II) is then formed in the second polymerization reactor in the presence of the catalyst used in forming the block (I). The order of forming the block (I) and the block (II) may be reversed, or that is, the block (II) may be formed first and then the block (I) may be formed. In such gas-phase polymerization, the soft propylene-based resin composition of the present invention is obtained generally as a particulate polymer after the completion of the polymerization. The method for making the thus-produced, soft propylene-based resin composition which satisfies the above-mentioned conditions (a) to (d) is not specifically limited.

One example for it is described as follows. A catalyst that comprises a $C_1$-symmetric metallocene of formula (I) and a clay mineral and optionally an organoaluminum compound is used. The catalyst is specifically so designed that, when the block (I) is formed through polymerization in the presence of the catalyst, the isotactic pentad (mmmm) thereof, measured by $^{13}$C-NMR, is less than 90% and the block (I) has a stereospecificity distribution.

Regarding the stereospecificity distribution, the catalyst and the polymerization are specifically so selected that the polymer formed satisfies the condition (c) and has a high-melting-point component. Next, the block (II) is formed also through polymerization, whereupon the ratio of the block (I) to the block (II) is specifically controlled so that the polymer satisfies the condition (a).

In general, the tensile modulus can be efficiently controlled by controlling the isotactic pentad of the block (I) and the weight fraction of the block (II) in the resin composition produced. When the block (II) is formed through polymerization, the ethylene content of the block (II) is controlled so that the polymer produced satisfies the condition (b). In general, the ethylene content of the block (II) is an important control factor to determine the transparency of the polymer produced, and when it is relatively lowered, then the polymer produced can satisfy the condition (b). In order that the polymer can satisfy the condition (d), the catalyst is preferably so selected that the amount of the component having a relatively low molecular weight and a relatively low stereospecificity to be in the polymer produced is not too much. Also preferably, the polymerization temperature is lowered to make the produced polymer have a relatively high mean molecular weight, in order that the polymer can satisfy the condition (d).

Further, it is also desirable that the particle size of the clay mineral, one catalyst component, is enlarged in some degree to make the produced polymer satisfy the condition (d). In particular, when the weight-average particle size of the clay mineral used is larger than 30μ, then the polymer particles produced may be prevented from being sticky and the bulk density thereof can be increased. The polymer particles that are not sticky may also be produced according to the following methods. Large-size particles having a mean particle size of 30 microns or more are used for the carrier of the catalyst to be used in gas-phase polymerization. After the block (I) has been produced, the block (II) is produced in the presence of a Lewis base activity retardant such as alcohol, amine, ether, ester, carboxylic acid, ketone, or aldehyde. The block (I) and/or the block (II) are produced through polymerization in the presence of fine particles such as silica.

A resin composition that satisfies the conditions (a) to (c) may be prepared by physical blending, and may be ground or granulated so that it may satisfy the condition (d). In that manner, the soft propylene-based resin composition of the present invention that satisfies the conditions (a) to (d) may be produced. One example of the method is described as follows. Polypropylene having an isotactic pentad (mmmm) content of less than 90% is produced by the use of a metallocene catalyst. Apart from it, a propylene/ethylene copolymer having a low ethylene content is produced by the use of a Ziegler-Natta catalyst or a metallocene catalyst. These are kneaded through an extruder or the like. In this stage, if desired, homopolypropylene produced with a Ziegler-Natta catalyst may be kneaded with them. After being thus kneaded, the resulting mixture is granulated by the use of a pelletizer. After being thus granulated, it may be further ground.

In another embodiment, the present invention provides soft polypropylene-based resin compositions which have a stereoblock structure and is characterized in that it substantially comprises soft propylene-based resin particles having bulk density, measured according to JIS K 7365, of at least 0.3 g/cm$^3$.

The condition of the bulk density as above indicates that the resin composition is not so sticky, as so mentioned hereinabove. Like in the above, the bulk density is at least 0.3 g/cm$^3$, preferably at least 0.32 g/cm$^3$, more preferably at lest 0.35 g/cm$^3$, and is generally at most 0.5 g/cm$^3$, preferably at most 0.48 g/cm$^3$, more preferably at most 0.46 g/cm$^3$.

If the bulk density is lower than 0.3 g/cm$^3$, then it is unfavorable since the flowability of the particles in producing the resin composition of the present invention during gas-phase two-stage polymerization is not good and the amount of the particles that may stay in the reactor will decrease, and therefore, the productivity is low. On the other hand, if the bulk density is larger than 0.5 g/cm$^3$, then it is also unfavorable since the particles will be too densely packed in the reactor and they might not mix well with gas while produced by gas-phase polymerization.

The soft polypropylene-based resin composition of the present invention comprises particles having a high bulk density, and its industrial applicability is great. Concretely, when the composition is produced by gas-phase two-stage polymerization, particles having a high bulk density are highly flowable, neither adhering to nor plugging reactors and conveyor pipes, and therefore enable long-term, continuous and stable operation to produce them. In addition, a large amount of the particles having a high bulk density can remain in a reactor, and therefore the polymer yield relative to the catalyst unit weight can be increased and the catalyst cost can be thereby reduced.

The soft polypropylene-based resin composition as above can be produced, for example, by producing a resin composition having a stereoblock structure in a known method, and then grinding or granulating it so that the resulting polymer particles can satisfy the bulk density condition. One example of the method is described as follows. Polypropylene having an isotactic pentad (mmmm) content of less than 90% is produced by the use of a metallocene catalyst. Apart from it, a propylene/ethylene copolymer having a low ethylene content is produced by the use of a Ziegler-Natta catalyst or a metallocene catalyst. These are kneaded through an extruder or the like. In this stage, if desired, homopolypropylene produced with a Ziegler-Natta catalyst may be kneaded with them. After being thus kneaded, the resulting mixture is granulated by the use of a pelletizer. After being thus granulated, it may be further ground.

Modification of Soft Propylene-Based Resin

Various additive polymers may be added to the soft propylene-based resin composition of the present invention, so long as they do not detract from the excellent flexibility, transparency, and heat resistance of the resin composition. Such additives include various propylene-based polymers such as propylene homopolymer, propylene/α-olefin copolymer, propylene/α-olefin block copolymer; ethylene-based polymers such as high-pressure-process polyethylene, ethylene/α-olefin copolymer, ethylene/vinyl acetate copolymer, ethylene/norbornene copolymer; hydrogenated derivatives of polybutene-1 or styrene/butadiene block copolymer.

If also desired, an α-crystal nucleating agent, β-crystal nucleating agent, which are generally used for improving the transparency of propylene-based polymers, may be added to the resin composition of the present invention. Further, a rubber softener such as mineral oil for improving flexibility may be added to it.

In addition, the soft propylene-based resin composition of the present invention may further contain other various additives, for example, other various resins and rubbers; fillers such as glass fibers, calcium carbonate, silica, talc, mica, clay; flame retardants such as aluminum hydroxide, magnesium hydroxide; antioxidants; light stabilizers; antistatic agents; lubricants; dispersants; neutralizing agents; tackifiers such as petroleum resin; and antiblocking agents.

In accordance with its applications, the soft propylene-based resin composition of the present invention may be mechanically crosslinked with a known crosslinking agent in the presence of a crosslinking promoter, and may be grafted with α,β-unsaturated carboxylic acid such as maleic anhydride in the presence of an organic peroxide.

Applications of Soft Propylene-Based Resin Composition

The soft propylene-based resin composition of the present invention has good flexibility, transparency and heat resistance, and is favorably used in various fields where conventional ethylene-based materials, propylene-based materials as well as flexible PVC and thermoplastic elastomers are used, either as it is alone or as an essential ingredient of a mixture that comprises it. Suitable methods for molding the resin composition are not specifically limited. For example, films and sheets may be formed from it by inflation, T-die extrusion, or calendering which is applied to polyolefins. They may have a single-layered or two or more multi-layered structure, formed in any desired manner. For laminating multiple layers, extrusion lamination, thermal lamination, or dry lamination may be employed. The films formed may be monoaxially or biaxially oriented. For orienting them, rolling, tentering, or tubular formation may be employed. In addition, the films may be surface-processed through corona discharging treatment, flame treatment, plasma treatment, or ozone treatment.

The soft propylene-based resin composition of the present invention has good flexibility, transparency and heat resistance, and when laminates are produced with it, the material to form the other layers may be any of various propylene-based polymers such as propylene homopolymer, propylene/α-olefin copolymer, propylene/α-olefin block copolymer; ethylene-based polymers such as high-pressure-process polyethylene, ethylene/α-olefin copolymer, ethylene/vinyl acetate copolymer, EVOH, ethylene/norbornene copolymer; other various olefin copolymers such as polybutene-1, poly-4-methylpentene-1 (TPX resin); maleic anhydride-modified adhesive polyolefins; polyamides; polyesters; and polyester elastomers.

Applications for Films and Sheets

The application of the soft propylene-based resin composition or its modified derivatives of the present invention in the field of films and sheets is not specifically limited. Some examples are mentioned below. Stretch films for wrapping, wrapping films for industrial or household use, pallet stretch films, stretch labels, shrink films, shrink labels, films for sealants, films for retorts, sealant films for retorts, hot-melt films, hot-adhesive films, hot-seal films, bag-in-box sealant films, retort pouches, standing pouches, spout pouches, laminate tubes, laminate bags, fiber-wrapping films in the field of wrapping or packaging foods or sundries; films for houses and multi-films in the field of agricultural films; infusion bags, multi-room containers for high-calorie infusion or peritoneal dialysis (CAPD), discharge bags for peritoneal dialysis, blood bags, urine bags, operation bags, ice pillows, ampoule cases, PTP wrapping bags in the field of films and sheets for medical use; civil engineering impermeable sheets, cut-off materials, caulking materials, floor materials, roofing materials, plate decorative films, plate skin films and wallpapers in the field of construction and building; leathers, ceiling materials, trunk room liners, interior skin materials, shock-absorbent sheets and sound-absorbent sheets are used in the field of automobile parts; display covers, battery cases, mouse pads, mobile phone cases, IC card cases and CD-ROM cases in the field of light electrical appliances; toothbrush cases, puff cases, cosmetic cases, eye drop and other medicine cases, tissue cases, face packs in the field of toiletry and sanitary goods; films and sheets for stationery, clear files, pen cases, pocketbook covers, desk mats, key board covers, book covers and binders in the field of office supplies; leathers for furniture, toys such as beach balls, rain goods such as umbrellas and raincoats, table cloths, blister packages, bathtub covers, towel cases, fancy cases, tag cases, pouches, charm bags, insurance certificate covers, passbook covers, passport cases and cutlery cases in the field of appliances and sundries for household use; and retroreflector sheets and synthetic paper in other fields. In addition, adhesive tapes, marking films, semiconductor or glass dicing films, surface-protective films, steel plate and plywood plate-protective films, car-protective films, wrapping and binding adhesive tapes, adhesive tapes for office use or household use, bonding adhesive tapes, paint-masking adhesive tapes, surface-protective adhesive tapes, sealing adhesive tapes, anticorrosive and waterproof adhesive tapes, electric insulating adhesive tapes, adhesive tapes for electronic appliances, adhesive tapes for medical and sanitary use such as plaster films and substrate films for adhesive plasters, adhesive tapes for discrimination and decoration, tapes for display, wrapping tapes, surgical tapes and adhesive tapes for labels in the field of adhesive films and sheets that are prepared by applying adhesive to substrates.

Applications for Injection Molding and Extrusion Molding

The application of the soft propylene-based resin composition or its modified derivatives of the present invention in the field of injection molding and extrusion molding is not specifically limited. Some examples are mentioned below. Coating materials for electric cables, codes and wire harnesses in the field of electric and electronic appliances; control cable coating materials, air bags and covers, mud guards, bumpers, boots, air hoses, lamp packing, gaskets, various braids such as window braids, site shields, weather strips, glass run channels, grommets and shock-absorbent and sound-absorbent parts for automobile parts; various gaskets, grips, belts, foot rubbers, rollers, protectors, suckers, gaskets for refrigerators, various rolls for OA appliances, tubular shaped articles such as hoses and tubes, profile-shaped articles, leather-like articles and engage tools in the field of electric and electronic appliances for household use and light electric appliances; soft-touch dolls and figures in the field of toys; pen grips and toothbrush grips in the field of daily sundries; as well as containers such as housewares and tableware, binding bandages, blow-molded infusion bottles, food bottles, other various bottles such as those for cosmetics or personal care, as well as catheters, syringes, syringe gaskets, infusion cylinders, tubes, ports, caps, rubber stoppers disposable containers in other fields. In addition, the resin composition of the invention is applicable to foam-molding.

Applications for Fibers and Nonwoven Fabrics

The application of the soft propylene-based resin composition or its modified derivatives of the present invention in the field of fibers and nonwoven fabrics is not specifically limited. Some examples are mentioned below. They are applicable to fibers and flat yarns such as continuously spun fibers, continuously crimped yarns, short fibers, monofilaments, or may be formed into nonwoven fabrics in a mode of melt-blowing or spun-bonding. These are used for sanitary goods such as disposable diapers; medical goods such as surgical gowns and gloves; as well as carpets, their linings, and ropes. In addition, these nonwoven fabrics, monofilaments, flat yarns and slit tapes and other knitted fabrics may be laminated with other films or sheets to give canvas cloths, tent cloths, hoods, flexible containers, leisure sheets, tarpaulins.

Applications for Modifiers

The soft propylene-based resin composition or its modified derivatives of the present invention have a good affinity for polypropylene, and are therefore favorably used for modifying polypropylene. Modified with it, polypropylene may have improved flexibility, transparency and stiffness, and in addition, may have improved hot-sealability, impact resistance, and affinity for additives. Accordingly, the resin composition of the present invention may also be used for improving the surface of molded articles. Further, as having good thermal fusibility, it may also be used in other applications of hot-melt adhesives, tackifiers, asphalt modifiers, bitumen modifiers, waterproofed paper, etc.

Other features of the invention will become apparent in the course of the following descriptions of exemplary embodiments which are given for illustration of the invention and are not intended to be limiting thereof.

EXAMPLES

In the following Examples, MFR was determined according to ASTM-D-1238. The total content of ethylene and optional α-olefin having from 4 to 20 carbon atoms in the copolymer formed in the second stage was determined by $^{13}$C-NMR.

The melting point of the soft propylene-based resin and/or the soft propylene-based resin composition was measured according to the method described hereinabove.

To determine the physical properties of the soft propylene-based resin composition of the present invention, samples of the composition were produced according to the method mentioned below, and they were tested according to the methods (a) to (d) mentioned below.

Concretely, 0.05 parts by weight of tetrakis[methylene-3-(3',5'-di-t-butyl-4'-hydroxyphenyl)propionate]methane (Nippon Ciba-Geigy's "Irganox 1010") and 0.05 parts by weight of tris(2,4-di-t-butylphenyl) phosphite (Nippon Ciba-Geigy's "Irgafos 168") both serving as an antioxidant, and 0.03 parts by weight of a neutralizer, Kyowa Chemical Industry's "DHT-4A" were added to 100 parts by weight of the soft propylene-based resin composition to be analyzed, and melted and kneaded in a laboratory plastomill at a preset temperature of 200° C. at 150 rpm for 1 minutes, and then pressed by the use of a hydraulic pressing machine (by Shinto Metal) at a preset temperature of 200° C. and under a pressure of 100 kg/cm$^2$ into a press sheet sample having a thickness of 2 mm.

(a) Density:

As so mentioned hereinabove, the bulk density of the sample was measured according to JIS K 7365, and the true density thereof was measured by a water displacement method according to JIS K 7112.

(b) Hardness:

Using a type-D durometer, hardness was measured according to JIS K 7215.

(c) Tensile Characteristic:

A number 2-type test piece was prepared according to JIS K 7113, and it was tested at a temperature of 23° C. and at a tensile rate of 50 mm/min to determine its tensile modulus and tensile elongation at break.

(d) Internal Parallel Light Transmittance:

Measured according to JIS K 7105.

Example 1

(1) Production of dichloro{1,1'-dimethylsilylene[2-methyl-1-indenyl]-[2-methyl-4-phenyl-4H-azulenyl]}hafnium:

The following process was all carried out in a dry nitrogen atmosphere, according to ordinary Schlenk techniques. Toluene, tetrahydrofuran, and diethyl ether for solvent were dried over benzophenone ketyl with sodium metal before use. N-hexane used herein was dehydrated n-hexane by Kanto Chemical.

A n-hexane solution of n-butyllithium (50.0 ml, 79.5 mmols, 1.59 N) was dropwise added to a suspension of 2-methylindene (9.8 g, 75.3 mmols) and n-hexane (100 ml) through a syringe at −70° C., over 10 minutes. With stirring, this was gradually warmed up to room temperature, over 2 hours. This was further stirred for 20 hours at room temperature, and the solid component was removed by filtration from the resulting pale yellow suspension via a cannula. The thus-filtered solid was washed twice with 30 ml of n-hexane, and then dried under reduced pressure to a constant weight to obtain 9.6 g of a lithium salt ($Li[2-Me-C_9H_6]$).

Apart from it, 2-methylazulene (5.6 g, 39.7 mmols) was dissolved in 120 ml of n-hexane, and a cyclohexane/diethyl ether solution of phenyllithium (40.0 ml, 42.4 mmols, 1.06 N) was dropwise added thereto through a syringe at 0° C., over 10 minutes. The resulting dark blue solution was stirred at 0° C. for 3 hours, and then warmed up to room temperature, over 0.5 hours. The solid component was removed by filtration from the resulting beige suspension via a cannula, and the resulting solid was washed twice with 50 ml of n-hexane. This was dried under reduced pressure to a constant weight, and 9.0 g of a lithium salt ($Li[2-Me-4Ph-4H-C_{10}H_6]$) was obtained.

A solution of dimethyldichlorosilane (7.7 g, 60.0 mmols) and dry diethyl ether (50 ml) was cooled to 0° C., and a tetrahydrofuran/diethyl ether solution (90 ml, tetrahydrofuran/diethyl ether=½) of the previously-prepared lithium salt ($Li[2-Me-C_9H_6]$, 2.7 g, 20.0 mmols) was dropwise added thereto, over 80 minutes. The resulting white suspension was then stirred at 0° C. for 1 hour, and thereafter at room temperature for 1 hour. After thus stirred, the suspension was filtered through a cannula. The solvent was removed under reduced pressure from the resulting transparent filtrate, and the solvent was further removed from it under 0.5 mmHg until it had a constant weight. Thus obtained, this is a pale yellow oil, dimethyl(2-methyl-1-indenyl)chlorosilane (4.5 g).

N-methylimidazole (50 μmols) was added to a mixed solution of diethyl ether (60 ml)/tetrahydrofuran (30 ml) of the previously-prepared lithium salt ($Li[2-Me-4Ph-4H-C_{10}H_6]$, 4.5 g, 20.0 mmols), and the resulting solution was cooled to 0° C. A diethyl ether solution (60 ml) of dimethyl (2-methyl-1-indenyl)chlorosilane (4.5 g, 20.0 mmols) was dropwise added to it, over 10 minutes. After the addition, this was warmed up to room temperature, and then stirred at room temperature for 2 hours. After the stirring, 50 ml of ice-water added to it to quench the reaction. The organic layer was separated through a separating funnel, and this was washed with 30 ml of water. The aqueous layer was extracted twice with 50 ml of diethyl ether, and the resulting extract was combined with the previously-obtained organic layer and then dried over magnesium sulfate. The solvent was removed from it with a rotary evaporator, and the resulting dark yellow oil was kept under a reduced pressure at 0.4 mmHg until it had a constant weight. Thus obtained, this is dimethyl(2-methyl-1-indenyl)(2-methyl-4-phenyl-4H-1-azulenyl)silane (8.1 g).

A n-hexane solution of n-butyllithium (9.4 ml, 14.9 mmols, 1.59 N) was added to a n-hexane solution (120 ml) of dimethyl(2-methyl-1-indenyl)(2-methyl-4-phenyl-4H-1-azulenyl)silane (2.9 g, 7.1 mmols) obtained herein, at 0° C. through a syringe, over 5 minutes. Next, this was stirred at 0° C. for 1.5 hours, and then at room temperature for 17.5 hours. The resulting suspension was filtered through a cannula, and the solid thus obtained was washed twice with 30 ml of n-hexane. The solid was dried under reduced pressure to give an yellow brown powder, dimethyl(2-methyl-1-indenyl)(2-methyl-4-phenyl-4H-1-azulenyl)silane dilithium salt (3.0 g).

The resulting dilithium salt (0.42 g, 1.0 mmol) and hafnium tetrachloride (0.32 g, 1.0 mmol) were metered in an inert gas atmosphere in a glove box, and put into a 100-ml round-bottom flask (equipped with a magnetic stirrer therein) in the glove box. The round-bottom flask was taken out of the glove box, and immediately cooled to −70° C. Distilled toluene (45 ml) and diethyl ether (5 ml) were added to it through a syringe, and the resulting mixture was stirred at −70° C. for 3 hours and then at room temperature for 18 hours. The resulting suspension was filtered through a cannula, and the volatile component was removed from the resulting filtrate under reduced pressure to obtain a viscous solid.

The thus-obtained solid was put into 10 ml of n-hexane and stirred for 30 minutes. This was filtered through a cannula to separate the n-hexane supernatant. The solid residue was extracted 4 times with 10 ml of n-hexane, and the extract was filtered through a cannula to separate the n-hexane supernatant. In every extraction operation, the system was vigorously stirred for at least 10 minutes. The extracts were combined and the solvent was removed under reduced pressure whereby the volume of the residue reached about 5 ml. The resulting yellow suspension was cooled to −10° C. and kept as such for 48 hours.

After having been cooled, the suspension was filtered through a cannula, and the pale yellow solid residue was dried under reduced pressure to obtain the intended dichloro{1,1'-dimethylsilylene[2-methyl-1-indenyl]-[2-methyl-4-phenyl-4H-azulenyl]}hafnium as an yellow powder. Its yield was 76 mg, corresponding to 12%.

(2) Chemical Treatment of Clay Mineral:

Desalted water (113 ml), dry lithium hydroxide (16.3 g), and sulfuric acid (66.4 g) were put into a 300-ml round-bottom flask and dissolved with stirring. A commercial product, granular montmorillonite (Mizusawa Chemical's Benclay SL, 41.6 g) was dispersed in the resulting solution, and heated up to boiling, taking 10 minutes. At the boiling point (108° C.), this was stirred for 140 minutes. Next, 600 ml of desalted water was added to it and cooled, and the resulting slurry was filtered to collect a wet cake. The thus-collected wet cake was again dispersed in desalted water (600 ml) in a 1,000-ml beaker to give a slurry, and then this was filtered. This operation was repeated twice. The final cake was dried in air at 100° C. for 3 hours to obtain chemically-processed montmorillonite (37.1 g).

(3) Polymerization:

A toluene solution of triethylaluminum (0.45 mmol/ml, 2.3 ml) was added to the chemically-processed montmorillonite (0.52 g) obtained in Example 1(2), and stirred at room temperature for 1 hour. Toluene (20 ml) was added to the resulting suspension and stirred, and the supernatant was removed. This operation was repeated twice to obtain a clay slurry.

Tosoh-Akzo's triisobutylaluminum (0.045 mmols) was put into a different flask, and a toluene dilution of dichloro{1,1'-dimethylsilylene[2-methyl-1-indenyl]-[2-methyl-4-phenyl-4H-azulenyl]}hafnium (2.95 mg, 4.51 μmols) obtained in Example 1(1) was added to it, and the mixture was stirred at room temperature for 5 minutes. The above clay slurry was added to all the resulting complex solution, in an amount of 161.5 mg in terms of the solid content of the slurry, and the resulting mixture was stirred at room temperature for 40 minutes to prepare a catalyst slurry.

Next, all the catalyst slurry was put into an induction-stirring autoclave having an inner volume of 2 liters. Triisobutylaluminum (0.50 mmols) was introduced into the catalyst feeder fitted in the autoclave, and liquefied propylene (100 ml) was introduced into the autoclave at 30° C. and pre-polymerized for 10 minutes.

After the prepolymerization, the catalyst feeder was pressurized and triisobutylaluminum (0.50 mmols) was introduced into the liquefied propylene. Additional liquefied propylene (500 ml) was introduced at 30° C. and heated. This was heated up to 65° C., and then continuously stirred at the temperature for 90 minutes. After the stirring, the non-reacted monomer was purged away and the polymerization was stopped to obtain a propylene homopolymer (block (I)).

The yield of the polymer was determined from the weight change of the autoclave before and after the polymerization, and was 113 g.

A part (15 g) of the propylene homopolymer (block (I)) was taken out of the autoclave, and the autoclave was again heated up to 65° C. Then, propylene and ethylene were introduced into it, and their copolymerization to give block (II) was started. Regarding the monomer composition, ethylene was 32 mol %, and propylene was 68 mol %. The pressure was 2.0 MPa. During the reaction, a mixed gas of ethylene/propylene was introduced into the reactor so that the monomer composition and the pressure could be kept constant. The reaction was carried out at 65° C. for 100 minutes, and then the non-reacted monomers were purged away to stop the polymerization. Thus, 235 g of the propylene-based resin composition were obtained.

(4) Analysis and Evaluation of Propylene-Based Resin Composition:

The block (I) that had been sampled in Example 1(3) was analyzed. Its $^{13}$C-NMR confirmed that the block (I) was a stereoblock polypropylene and the microtacticity of the head-to-tail bonding propylene unit chain segments thereof was as follows: mmmm=89.9%, mmmr=3.6%, rmmr=0.2%, mmrr=3.0%, mmrm+rmrr=1.2%, rmrm=0.6%, rrrr=0.1%, rrrm=0.4%, mrrm=1.0%. The ratio of $S_1$ to S was 89.9%; and $4+2S_1/S_2=53.9$.

The amount of the regio-irregular units based on the propylene 2,1-insertion was 0.5% relative to the overall propylene insertion; and the amount of the regio-irregular units based on the propylene 1,3-insertion was 0.2%. The MFR of the block (I) was 4.0 g/10 min. DSC of the block (I) confirmed that the melting point peak thereof was 150.4° C. and the quantity of heat of crystal fusion thereof was 36.7 J/g.

The block (II) was analyzed. From the yield thereof, the content of the block (II) in the propylene-based resin composition obtained herein was 58.3% by weight. From it and from the ethylene content of the propylene-based resin composition determined through IR, the ethylene content of the block (II) was determined, and it was 11.6 mol %.

Further, the propylene-based resin composition was pressed into a sheet, and it was analyzed. The true density was 0.8835 g/cm$^3$; the D hardness was 56; the tensile modulus was 280 MPa; the tensile elongation at break was larger than 1000%; the internal light transmittance was 73.4%; and the melting point was 150.0° C. The press sheet had good flexibility, transparency and heat resistance and was not sticky.

Example 2

(1) Production of dichloro{1,1'-dimethylsilylene[2-methyl-1-indenyl]-[2-methyl-4-phenyl-4H-azulenyl]}zirconium:

A n-hexane solution of n-butyllithium (9.4 ml, 14.9 mmols, 1.59 N) was added to a n-hexane solution (120 ml) of dimethyl(2-methyl-1-indenyl)(2-methyl-4-phenyl-4H-1-azulenyl)silane (2.9 g, 7.1 mmols) obtained in Example 1(1), at 0° C. through a syringe, over 5 minutes. Next, this was stirred at 0° C. for 1.5 hours, and then at room temperature for 17.5 hours. The resulting suspension was filtered through a cannula, and the solid thus obtained was washed twice with 30 ml of n-hexane. The solid was dried under reduced pressure to give an yellow brown powder, dimethyl(2-methyl-1-indenyl)(2-methyl-4-phenyl-4H-1-azulenyl)silane dilithium salt (3.0 g).

The resulting dilithium salt (0.42 g, 1.0 mmol) and zirconium tetrachloride (0.23 g, 1.0 mmol) were metered in an inert gas atmosphere in a glove box, and put into a 100-ml round-bottom flask (equipped with a magnetic stirrer therein) in the glove box. The round-bottom flask was taken out of the glove box, and immediately cooled to −70° C. Distilled toluene (45 ml) and diethyl ether (5 ml) were added to it through a syringe, and the resulting mixture was stirred at −70° C. for 3 hours and then at room temperature for 16 hours.

The resulting suspension was filtered through a cannula, and the volatile component was removed from the resulting filtrate under reduced pressure to obtain a viscous solid. The thus-obtained solid was put into 10 ml of n-hexane and stirred for 30 minutes. This was filtered through a cannula to separate the n-hexane supernatant. The solid residue was extracted 4 times with 10 ml of n-hexane, and the extract was filtered through a cannula to separate the n-hexane supernatant. In every extraction operation, the system was vigorously stirred for at least 10 minutes, and heated at times. The extracts were combined and the solvent was removed under educed pressure whereby the volume of the residue reached about 5 ml. The resulting yellow suspension was cooled to −10° C. and kept as such overnight.

After having been cooled, the suspension was filtered through a cannula, and the yellow solid residue was dried under reduced pressure to obtain the intended dichloro{1,1'-dimethylsilylene[2-methyl-1-indenyl]-[2-methyl-4-phenyl-4H-azulenyl]}hafnium as an yellow powder. Its yield was 82 mg, corresponding to 15%.

(2) Polymerization:

A toluene solution of triethylaluminum (0.45 mmol/ml, 2.3 ml) was added to the chemically-processed montmorillonite (0.51 g) obtained in Example 1(2), and stirred at room temperature for 1 hour. Toluene (20 ml) was added to the resulting suspension and stirred, and the supernatant was removed. This operation was repeated twice to obtain a clay slurry.

Tosoh-Akzo's triisobutylaluminum (0.15 mmols) was put into a different flask, and a toluene dilution of dichloro{1,1'-dimethylsilylene[2-methyl-1-indenyl]-[2-methyl-4-phenyl-4H-azulenyl]}zirconium (8.56 mg, 15.1 μmols) obtained in Example 2(1) was added to it and stirred at room temperature for 5 minutes. All the resulting complex solution was added to the above clay slurry, and stirred at room temperature for 40 minutes to prepare a catalyst slurry.

Next, all the catalyst slurry obtained herein was put into an induction-stirring autoclave having an inner volume of 2 liters. Triisobutylaluminum (0.50 mmols) was introduced into the catalyst feeder fitted in the autoclave. Liquefied propylene (100 ml) was introduced into the autoclave at 30° C. and pre-polymerized for 10 minutes.

After the prepolymerization, the catalyst feeder was pressurized and triisobutylaluminum (0.50 mmols) was introduced into the liquefied propylene. Additional liquefied propylene (500 ml) was introduced into it at 30° C. and heated. This was heated up to 50° C., and then continuously stirred at the temperature for 90 minutes. After the stirring, the non-reacted monomer was purged away and the polymerization was stopped to obtain a propylene homopolymer (block (I)). The yield of the polymer was determined from the weight change of the autoclave before and after the polymerization, and was 98 g.

A part (15 g) of the propylene homopolymer (block (I)) was taken out of the autoclave, and the autoclave was again heated up to 40° C. Then, propylene and ethylene were introduced into it, and copolymerization to give block (II) was commenced. Regarding the monomer composition, ethylene was 25 mol %, and propylene was 75 mol %. The pressure was 2.0 MPa. During the reaction, a mixed gas of ethylene/propylene was introduced into the reactor so that the monomer composition and the pressure could be kept constant. The reaction was carried out at 40° C. for 17 minutes, and then the non-reacted monomers were purged away to stop the polymerization. Thus, 260 g of the propylene-based resin composition was obtained.

(3) Analysis and Evaluation of Propylene-Based Resin Composition:

The block (I) that had been sampled in Example 2(2) was analyzed. Its $^{13}$C-NMR confirmed that the block (I) was a stereoblock polypropylene and the microtacticity of the head-to-tail bonding propylene unit chain segments thereof was as follows: mmmm=76.4%, mmmr=7.1%, rmmr=1.2%, mmrr=6.2%, mmrm+rmrr=2.8%, rmrm=1.4%, rrrr=0.8%, rrrm=1.4%, mrrm=2.7%. The ratio of $S_1$ to S was 76.4%; and $4+2S_1/S_2=25.5$.

The amount of the regio-irregular units based on the propylene 2,1-insertion was 0.6% relative to the overall propylene insertion. The amount of the regio-irregular units based on the propylene 1,3-insertion was only a little, and could not be determined accurately. GPC of the resin composition confirmed that the weight-average molecular weight, Mw of the block (I) was 82,000, and Mw/Mn was 3.2.

The block (II) was analyzed. From the yield thereof, the content of the block (II) in the propylene-based resin composition obtained herein was 68.1% by weight. From it and from the ethylene content of the propylene-based resin composition determined through IR, the ethylene content of the block (II) was determined, and it was 16.5 mol %.

Further, the propylene-based resin composition was pressed into a sheet and it was analyzed in the same manner as in Example 1(4). The press sheet had good flexibility and transparency.

Comparative Example 1

(1) Production of Racemic dichloro{1,1'-dimethylsilylenebis[2-ethyl-4-(2-fluoro-4-biphenylyl)-4H-azulenyl]}hafnium:

2-Fluoro-4-bromobiphenyl (6.35 g, 25.3 mmols) was dissolved in a mixed solvent of diethyl ether (50 ml) and n-hexane (50 ml), and an n-pentane solution of t-butyllithium (33 ml, 50.6 mmols, 1.54 N) was dropwise added thereto at −78° C. This was stirred at −10° C. for 2 hours, and 2-ethylazulene (3.55 g, 22.8 mmols) was added to the resulting solution, and stirred at room temperature for 2 hours. N-hexane (30 ml) was added to it, and the supernatant was removed through decantation. This operation was repeated once again. N-hexane (30 ml) and tetrahydrofuran (40 ml) were added to the resulting yellow precipitate at 0° C. Next, N-methylimidazole (50 µl) and dimethyldichlorosilane (1.4 ml, 11.4 mmols) were added to it, and warmed up to room temperature. This was stirred at room temperature for 1 hour. Next, diluted hydrochloric acid was added to it, and this was subjected to liquid-liquid separation.

Then, the resulting organic phase was dried with magnesium sulfate, and the solvent was evaporated away under reduced pressure to give a crude product of dimethylsilylenebis(2-ethyl-4-(2-fluoro-4-biphenyl)-1,4-dihydroazulene) (8.3 g).

Next, the resulting crude product was dissolved in diethyl ether (30 ml), and a n-hexane solution of n-butyllithium (14.9 ml, 22.8 mmols, 1.53 N) was dropwise added to it at −70° C., then gradually warmed, and stirred overnight at room temperature. Toluene (200 ml) was further added to it, and cooled to −70° C. Then, hafnium tetrachloride (3.6 g, 11.4 mmols) was added to it, gradually warmed, and stirred at room temperature for 4 hours. A major part of the solvent was evaporated away under reduced pressure from the resulting slurry, and diethyl ether (50 ml) was added to it, and the resulting slurry was filtered.

This was washed with diethyl ether (5 ml×2), ethanol (15 ml×2) and n-hexane (10 ml×2), and dichloro{1,1'-dimethylsilylenebis[2-ethyl-4-(2-fluoro-4-biphenylyl)-4H-azulenyl]}hafnium racemate/meso mixture (4.53 g, yield 42%) was obtained. The resulting racemate/meso mixture was analyzed through $^1$H-NMR, which confirmed that it was a mixture of racemate 76.6% and meso form 23.4%.

Thus obtained, the racemate/meso mixture (4.5 g) was suspended in dichloromethane (35 ml), and irradiated with light from a high-pressure mercury lamp (100 W) for 1 hour. The solvent was evaporated away under reduced pressure, and toluene (25 ml) and dichloromethane (11 ml) were added to the resulting solid. When heated at 60° C., this gave a uniform solution. Dichloromethane was evaporated away under reduced pressure, and a crystal was deposited. The resulting crystal was taken out through filtration, washed twice with hexane (5 ml), and dried under reduced pressure to obtain the racemate (1.79 g).

(2) Polymerization:

The polymerization was effected in the same manner as in Example 1(3) except that the complex obtained in Comparative Example 1(1) was used and that the amount of the catalyst fed to the system was ⅓. The yield of the propylene homopolymer (block (I)) obtained in the first stage polymerization was 122 g. After a part (15 g) of the propylene homopolymer (block (I)) had been taken out of the autoclave, propylene and ethylene were copolymerized to form the block (II). The final propylene-based resin composition was 319 g.

(3) Analysis and Evaluation of Propylene-Based Resin Composition:

The block (I) that had been sampled in Comparative Example 1(2) was analyzed. Its $^{13}$C-NMR was examined to analyze the microtacticity of the head-to-tail bonding propylene unit chain segment thereof and confirmed that the block (I) was not a stereoblock polypropylene but was an isotactic polypropylene of substantially mmmm alone. $S_1$/S was almost 100%. The amount of the regio-irregular units based on the propylene 2,1-insertion was 0.2% relative to the overall propylene insertion; and the amount of the regio-irregular units based on the propylene 1,3-insertion was 0.2%. MFR of the block (I) was 4.0 g/10 min.

The block (II) was analyzed. From the yield thereof, the content of the block (II) in the propylene-based resin composition obtained herein was 66.5% by weight. From it and from the ethylene content of the propylene-based resin composition determined through IR, the ethylene content of the block (II) was determined, and it was 11.0 mol %.

Further, the propylene-based resin composition was pressed into a sheet and it was analyzed in the same manner as in Example 1(4). The true density was 0.8881 g/cm$^3$; the D hardness was 61; the tensile modulus was 495 MPa; the tensile elongation at break was larger than 854%; the internal light transmittance was 61.6%; and the melting point was 157.5° C. The press sheet obtained herein was inferior to that obtained in Example 1 in regard to both the flexibility and the transparency thereof.

Example 3

(1) Production of dichloro{1,1'-dimethylsilylene[2-methylbenzo[e]indenyl]-[2-methyl-4-phenyl-4H-azulenyl]}hafnium:

2-Methylbenzo[e]indene (1.87 g, 10.4 mols) was dissolved in dehydrated n-hexane (38 ml), and n-butyllithium (1.59 M, 6.6 ml, 10.5 mmols) was added to the resulting solution at 0° C. through a syringe. The solution was at first transparent and gradually became cloudy, and formed a precipitate. The white suspension was stirred at room temperature for 24 hours and filtered through a cannula. The resulting white solid was washed with dry n-hexane (10 ml×2), and dried under reduced pressure to obtain a spongy white solid (1.84 g, yield 95%).

The thus-obtained white solid (2-methylbenzo[e]indenyllithium, 0.94 g, 5.1 mmols) was dissolved in dry tetrahydrofuran/diethyl ether (40 ml, 1/1 v/v). On the other hand, dimethyldichlorosilane (2.60 g, 20.2 mmols) was dissolved in dry tetrahydrofuran/diethyl ether (20 ml, 1/1 v/v), and the resulting solution was dropwise added to the previously-prepared 2-methylbenzo[e]indenyllithium solution at −5° C., over 1 hour. After the addition, this was immediately warmed up to 0° C. with stirring, and further stirred at room temperature for 2 hours. The solvent was removed from the pale yellow suspension under reduced pressure to obtain a yellow paste. The paste was extracted with dry diethyl ether (10 ml×3), and the resulting solution was filtered through a cannula. The filtrate was collected, the solvent was removed under reduced pressure, and this was dried under reduced pressure until it had a constant weight. The thus-obtained viscous yellow oil is 2-methylbenzo[e]indenyldimethylchorosilane (1.35 g, yield 100%).

400 MHz $^1$H-NMR (CDCl$_3$, room temperature): δ 8.01 (d, J=8.04 Hz, 1H), 7.79 (d, J=7.80 Hz, 1H), 7.54 (m, 2H), 7.44–7.35 (m, 2H), 7.16 (s, 1H), 3,73 (s, 1H), 2.31 (s, 3H), 0.29 (s, 3H), 0.06 (s, 3H).

The thus-obtained 2-methylbenzo[e]indenyldimethylchorosilane (1.35 g, 5.1 mmols) was dissolved in dry diethyl ether (30 ml). On the other hand, 2-methyl-4-phenyl-4H-azulenyllithium (1.13 g, 5.1 mmols) prepared according to the method of Example 1(1) was separately dissolved in dry tetrahydrofuran/diethyl ether (30 ml, 1/1 v/v) containing N-methylimidazole (10 μmols). The solution obtained herein was added to the solution of 2-methyl-4-phenyl-4H-azulenyllithium at a temperature of 0° C., over 15 minutes. This was stirred at 0° C. for 1 hour and then at room temperature for 2 hours.

Next, 30 ml of ice-water was added to the reaction mixture, and then rapidly stirred to quench the reaction. The aqueous layer was separated and extracted with diethyl ether (30 ml×2). The oily layer was collected, dried with magnesium sulfate, and filtered, and the solvent and the volatile component were removed. Further, the volatile component was completely removed, and a crude product, viscous dark brown oil was obtained.

The thus-obtained crude product was purified through a column with silica gel inactivated with tetrahydrofuran, using a solvent of n-hexane. The product fraction was collected, the solvent was removed from it, and the residue was dried under reduced pressure to obtain a yellow brown solid product (1.72 g, yield 76%).

All the solid product obtained herein was dissolved in dry n-hexane (25 ml), and a n-hexane solution of n-butyllithium (1.58 M, 5.1 ml, 8.0 mmols) was added to it through a syringe at −78° C., over 5 minutes. The mixture was stirred at −78° C., gradually warmed up to room temperature, and stirred overnight at room temperature. The yellowish suspension was refluxed in a nitrogen atmosphere for 1.5 hours and then filtered while hot. The solid residue was washed with n-hexane (15 ml×2) and dried under reduced pressure to obtain a yellow brown powder of dilithio{1,1'-dimethylsilylene[2-methylbenzo[e]indenyl]-[2-methyl-4-phenyl-4H-azulenyl]} (1.80 g, yield 100%).

In a glove box filled with an inert gas atmosphere, dilithio{1,1'-dimethylsilylene[2-methylbenzo[e]indenyl]-[2-methyl-4-phenyl-4H-azulenyl]} (0.469 g, 1.0 mmol) and hafnium tetrachloride (0.320 g, 1.0 mmol) were metered and put into a 100-ml round-bottom flask equipped with a gas cock. The flask was taken out of the glove box, and dipped in a cold bath at −5° C. Dry toluene (70 ml) and dry diethyl ether (10 ml) were added to it through a syringe, and the suspension was stirred for 15 hours. During this, its temperature gradually rose up to room temperature. The resulting suspension was filtered through Celite, the solvent was removed under reduced pressure from it, and a yellow crude complex (0.696 g, yield 99%) was obtained. The crude complex was analyzed by $^1$H-NMR, which confirmed that its main components were two different isomers.

The crude complex was extracted with toluene (5 ml×3), and the solid residue was dried under reduced pressure to obtain a pale yellow powder of dichloro{1,1'-dimethylsilylene[2-methylbenzo[e]indenyl]-[2-methyl-4-phenyl-4H-azulenyl]}hafnium (0.13 g, yield 19%). Its analysis by $^1$H-NMR and NOE confirmed that its main component was an exo-syn isomer and its minor component was exo-anti isomer. The ratio of exo-syn/exo-anti was 10/1 (by mol). The solvent was removed from the toluene extract, and this was dried under reduced pressure and washed with n-hexane (10 ml×3) to obtain an orange powder (0.41 g, yield 58%). Its $^1$H-NMR analysis confirmed that the powder is a complex with a main component of exo-anti isomer, having a ratio of exo-syn/exo-anti=1/2.5 (by mol).

Exo-anti isomer: 400 MHz $^1$H-NMR (CDCl$_3$, room temperature): δ 8.03 (d, J=7.83 Hz, 1H), 7.71 (d, J=7.83 Hz, 1H), 7.55 (m, 2H), 7.46 (m, 1H), 7.41 (s, 1H), 7.33 (m, 2H), 7.23 (m, 2H), 7.16 (m, 1H), 6.92 (d, J=11.6 Hz, 1H), 6.18 (m, 1H), 5.96 (m, 1H), 5.88 (m, 1H), 5.48 (s, 1H), 5.04 (br. s, 1H), 2.59 (s, 3H), 2.14 (s, 3H), 1.20 (s, 3H), 1.13 (s, 3H).

Exo-syn isomer: 400 MHz $^1$H-NMR (CDCl$_3$, room temperature): δ 8.06 (d, J=7.83 Hz, 1H), 7.77 (d, J=7.83 Hz, 1H), 7.60 (m, 2H), 7.52 (5, J=7.33 Hz, 1H), 7.35–7.15 (m, 6H), 6.97 (d, J=11.62 Hz, 1H), 6.04 (m, 1H), 5.82 (m, 1H), 5.70 (m, 1H), 5.55 (s, 1H), 4.71 (br. s, 1H), 2.59 (s, 3H), 2.37 (s, 3H), 1.23 (s, 3H), 1.13 (s, 3H).

(2) Chemical Treatment of Clay Mineral:

Desalted water (94 ml), lithium sulfate monohydrate (14.5 g), and sulfuric acid (21.9 g) were put into a 300-ml round-bottom flask and dissolved with stirring. A commercial product, granular montmorillonite (Mizusawa Chemical's Benclay SL, 29.4 g) was dispersed in the resulting solution, and heated up to boiling, taking 10 minutes. At the boiling point (105° C.), this was stirred for 120 minutes.

Next, 200 ml of desalted water was added to it and cooled, and the resulting slurry was filtered to collect a wet cake. Thus collected, the wet cake was again dispersed in desalted water (500 ml) in a 1,000-ml beaker to give a slurry, and then this was filtered. This operation was repeated twice. The final cake was dried in air at 100° C. for 3 hour to obtain chemically-processed montmorillonite (24.0 g).

(3) Prepolymerization:

The chemically-processed montmorillonite (1.02 g) obtained in Example 3(2) was dried at 200° C. under reduced pressure for 2 hours. A toluene solution of triethylaluminum (0.50 mmol/ml, 4.0 ml) was added to it, and stirred at room temperature for 30 minutes. Toluene (25 ml) was added to the resulting suspension and stirred, and the supernatant was removed. This operation was repeated twice to obtain a clay slurry.

Tosoh-Akzo's triisobutylaluminum (0.06 mmols) was put into a different flask, and dichloro{1,1'-dimethylsilylene[2-methylbenzo[e]indenyl]-[2-methyl-4-phenyl-4H-azulenyl]}hafnium (exo-syn/exo-anti=10/1 (by mol), 21.1 mg, 30.0 μmols) was added to and reacted with it to prepare a toluene solution thereof. All the complex solution was added to the above clay slurry, and stirred at room temperature for 1 hour to obtain a catalyst slurry.

Next, all the catalyst slurry was put into an induction-stirring autoclave having an inner volume of 2 liters. Toluene (90 ml) with triisobutylaluminum (0.06 mmols) therein was introduced into the autoclave, and liquefied propylene (30 ml) was introduced at 30° C. and prepolymerized at 30° C. for 90 minutes. The resulting prepolymerized catalyst slurry was put into a 200-ml round-bottom flask, the supernatant was removed, and this was washed with toluene (70 ml) containing triisobutylaluminum (0.018 mmols). The prepolymerized catalyst contained 4.0 g of polypropylene per gram of the solid catalyst component thereof.

(4) Propylene Homopolymerization (Formation of Block I):

5.0 ml of a toluene solution of triisobutylaluminum (0.1 mmol/ml) was put into a 2-liter induction-stirring autoclave with a built-in anchor-shaped stirring blade that had been purged with pure nitrogen. The prepolymerized catalyst slurry obtained in Example 3(3) was fed into it, in an amount of 100.0 mg in terms of the solid catalyst component thereof, and 625 g of liquefied propylene was introduced into it. Next, this was heated up to 60° C., and the polymerization was started. After 150 minutes, the monomer was purged away to stop the polymerization. From the autoclave weight change before and after the polymerization, the yield of polypropylene was determined, and it was 329 g.

Analysis of the thus-obtained polymer gave the following results: Its $^{13}$C-NMR confirmed that the polymer was a stereoblock polypropylene and the microtacticity of the head-to-tail bonding propylene unit chain segments thereof was as follows: mmmm=71.3%, mmmr=8.2%, rmmr=0.9%, mmrr=8.4%, mmrm+rmrr=3.7%, rmrm=2.0%, rrrr=0.7%, rrrm=1.1%, mrrm=3.9%. The ratio of $S_1$ to S was 71.3%; and $4+2S_1/S_2$=21.4.

The amount of the regio-irregular units based on the propylene 2,1-insertion was 0.1% relative to the overall propylene insertion; and the amount of the regio-irregular units based on the propylene 1,3-insertion was 0.1%. The MFR of the polymer was 4.2 g/10 min. DSC of the polymer confirmed that the melting point peak thereof was 145.3° C. and the quantity of heat of crystal fusion thereof was 52.2 J/g. With a solvent of o-dichlorobenzene, the polymer was analyzed through CFC. Besides the eluate at lower than 5° C., other elution peaks were found at around 60° C. and 100° C.

The eluate at lower than 5° C. was 12.9% by weight; its Mn was 41,000, Mw was 275,000, and Mw/Mn was 6.7. The eluate from 5° C. to lower than 135° C. was 87.1% by weight, and its Mn was 73,000, Mw was 249,000, and Mw/Mn was 3.4.

(5) Propylene/Ethylene Copolymerization (Formation of Block II):

5.0 ml of a toluene solution of triisobutylaluminum (0.1 mmol/ml) was put into a 2-liter induction-stirring autoclave with a built-in anchor-shaped stirring blade that had been purged with pure nitrogen. The prepolymerized catalyst slurry obtained in Example 3(3) was fed into it, in an amount of 90.4 mg in terms of the solid catalyst component thereof, and 500 g of liquefied propylene was introduced into it. Further, ethylene was introduced at an ethylene partial pressure of 0.70 MPa. Then, this was heated up to 45° C., and the polymerization was started. After 100 minutes, the monomer was purged away to stop the polymerization. From the autoclave weight change before and after the polymerization, the yield of the propylene/ethylene copolymer was determined, and it was 218 g. During the polymerization, the ethylene concentration in the vapor phase was determined through gas chromatography, and it was 18.7 mol % on average.

Analysis of the thus-obtained copolymer gave the following results: Its $^{13}$C-NMR confirmed that the ethylene content of the copolymer was 3.0 mol %. Its MFR was 9.2 g/10 min. DSC of the copolymer confirmed that the melting point peak thereof was 115.6° C., and the quantity of heat of crystal fusion thereof was 28.9 J/g. With a solvent of o-dichlorobenzene, the copolymer was analyzed through CFC. The eluate at lower than 5° C. was 33.7% by weight; its Mn was 43,000, Mw was 197,000, and Mw/Mn was 4.6. The eluate from 5° C. to lower than 135° C. was 66.3% by weight, and its Mn was 62,000, Mw was 219,000, and Mw/Mn was 3.5.

(6) Determination of Physical Properties:

The polymers obtained in Example 3(4) and (5) were melt-mixed in a laboratory plastomill according to the method mentioned above to obtain a soft propylene-based resin composition. The ratio of block (I) to block (II) was 35/65 by weight. The thus-obtained propylene-based resin composition was formed into press sheet samples with a pressing machine according to the method mentioned above. The press sheet was analyzed for the physical properties. The true density was 0.8805 g/cm$^3$; the D hardness was 57; the tensile modulus was 221 MPa; the tensile elongation at break was 895%; the internal ray transmittance was 85.9%; and the melting point was 143.6° C. The press sheet had good flexibility, transparency, and heat resistance and was not sticky.

Example 4

(1) Chemical Treatment of Clay Mineral:

Desalted water (94 ml), lithium sulfate monohydrate (14.5 g) and sulfuric acid (21.9 g) were put into a 300-ml round-bottom flask, and dissolved with stirring. A commercial product, granular montmorillonite (Mizusawa Chemical's Benclay SL, 30.5 g) was dispersed in the resulting solution, and heated up to boiling, taking 10 minutes. At the boiling point (105° C.), this was stirred for 120 minutes.

Next, 200 ml of desalted water was added to it and cooled, and the resulting slurry was filtered to collect a wet cake. Thus collected, the wet cake was again dispersed in desalted water (500 ml) in a 1,000-ml beaker to give a slurry, and then this was filtered. This operation was repeated twice. The final cake was dried in air at 100° C. for 3 hour to obtain chemically-processed montmorillonite (26.2 g).

(2) Prepolymerization:

The chemically-processed montmorillonite (1.56 g) obtained in Example 4(1) was dried at 200° C. under reduced pressure for 2 hours. A toluene solution of triethylaluminum (0.50 mmol/ml, 6.0 ml) was added to it, and stirred at room temperature for 30 minutes. Toluene (25 ml) was added to the resulting suspension and stirred, and the supernatant was removed. This operation was repeated twice to obtain a clay slurry.

Tosoh-Akzo's triisobutylaluminum (0.047 mmols) and dichloro{1,1'-dimethylsilylene[2-methylbenzo[e]indenyl]-[2-methyl-4-phenyl-4H-azulenyl]}hafnium (exo-syn/exo-anti=5/1 (by mol), 16.48 mg, 23.4 μmols) obtained in Example 3(1) were put into a different flask to prepare a toluene solution thereof. All the complex solution was added to the above clay slurry, and stirred at room temperature for 1 hour to obtain a catalyst slurry.

Next, all the catalyst slurry was put into an induction-stirring autoclave having an inner volume of 2 liters. Toluene (100 ml) with triisobutylaluminum (0.043 mmols) therein was introduced into the autoclave, and liquefied propylene (30 ml) was introduced at 30° C., and prepolymerized at 30° C. for 120 minutes. The resulting prepolymerized catalyst slurry was put into a 200-ml round-bottom flask, the supernatant was removed, and this was washed with toluene (70 ml) containing triisobutylaluminum (0.018 mmols). The prepolymerized catalyst contained 4.3 g of polypropylene per gram of the solid catalyst component thereof.

(3) Gas-Phase Two-Stage Polymerization:

110 g of large particles of polypropylene dried at 100° C. were put into an induction-stirring autoclave having an inner volume of 2 liters, and purged with nitrogen under reduced pressure. Next, triisobutylaluminum (0.20 mmols) was led into it, and the above prepolymerized catalyst was put in the catalyst feeder set inside the autoclave, in an amount of 67.2 mg in terms of the solid catalyst component thereof. The autoclave was heated, and the prepolymerized catalyst was led into it from the catalyst feeder at 50° C., and this was further heated while propylene was introduced thereinto.

After this was heated up to 65° C., the pressure was kept 1.8 MPa, and the reaction was continued at the temperature for 180 minutes. During the reaction, propylene gas was introduced into the autoclave so that the pressure therein could be kept constant. After the reaction, the non-reacted monomer was purged away to stop the polymerization, and a propylene homopolymer (block (I)) was obtained. From the autoclave weight change before and after the polymerization, the yield of the polymer was determined, and it was 68 g.

The autoclave was heated up to 60° C., and propylene and ethylene were introduced into it and copolymerized therein to give a block (II). Regarding the monomer composition, ethylene was 29 mol %, and propylene was 71 mol %. The pressure was 2.1 MPa. During the reaction, a mixed gas of ethylene and propylene was introduced into the reactor so that the monomer composition and the pressure could be kept constant.

The reaction was carried out at 60° C. for 120 minutes, and then the non-reacted monomers were purged away to stop the polymerization. After the polymerization, the product was sieved to fractionate the initially-added large-particle polypropylene from the intended gas-phase two-stage polymerization product, soft propylene-based resin composition. The soft propylene-based resin composition was thus obtained as a granular polymer. Its yield was 146 g, and its bulk density was 0.37 g/cm$^3$.

(5) Evaluation of Physical Properties:

The block (II) obtained in Example 4(3) was analyzed. From the yield of the propylene-based resin composition, the content of the block (II) in the resin composition was 53.4% by weight. From it and from the ethylene content of the propylene-based resin composition determined by $^{13}$C-NMR, the ethylene content of the block (II) was determined, and it was 10.5 mol %.

Further, the soft propylene-based resin composition particles obtained in Example 4(3) were kneaded and formed into press sheets according to the method mentioned above, and the press sheet was analyzed for the physical properties. The true density was 0.8780 g/cm$^3$; the D hardness was 47; the tensile modulus was 113 MPa; the tensile elongation at break was 1074%; the internal ray transmittance was 84.5%; and the melting point was 148.9° C. The press sheet had good flexibility, transparency, and heat resistance and was not sticky.

(6) Structure Analysis of Block (I):

In the same manner as in Example 4(3), the block (I) was prepared separately. Analysis of the polymer through $^{13}$C-NMR gave the following results: The polymer was a stereoblock polypropylene and the microtacticity of the head-to-tail bonding propylene unit chain segments thereof was as follows: mmmm=73.2%, mmmr=8.0%, rmmr=0.8%, mmrr=8.1%, mmrm+rmrr=3.9%, rmrm=1.6%, rrrr=0.5%, rrrm=1.1%, mrrm=2.8%. The ratio of $S_1$ to $S$ was 73.2%; and $4+2S_1/S_2=22.3$.

The amount of the regio-irregular units based on the propylene 2,1-insertion was 0.1% relative to the overall propylene insertion; and the amount of the regio-irregular units based on the propylene 1,3-insertion was 0.2%.

Example 5

(1) Chemical Treatment of Clay Mineral:

Desalted water (94 ml), lithium sulfate monohydrate (14.5 g), and sulfuric acid (22.1 g) were put into a 300-ml round-bottom flask, and dissolved with stirring. A commercial product, granular montmorillonite (Mizusawa Chemical's Benclay SL, 29.4 g) was dispersed in the resulting solution, and heated up to boiling, taking 20 minutes. This was stirred at 103° C. for 120 minutes. Next, 400 ml of desalted water was added to it and cooled, the resulting slurry was centrifuged, and the supernatant was removed through decantation to collect a wet cake. The thus-collected wet cake was again put into desalted water (400 ml) in a 1,000-ml beaker to give a slurry, and then this was subjected to centrifugation and decantation in the same manner as above. This operation was repeated twice. The final cake was dried in air at 100° C. for 3 hour to obtain chemically-processed montmorillonite (23.8 g).

(2) Prepolymerization:

The chemically-processed montmorillonite (0.52 g) obtained in Example 5(1) was dried at 200° C. under reduced pressure for 2 hours. Its dry weight was 0.48 g. A toluene solution of triethylaluminum (0.45 mmol/ml, 2.1 ml) was added to it, and stirred at room temperature for 30 minutes. Toluene (20 ml) was added to the resulting suspension and stirred, and the supernatant was removed. This operation was repeated twice to obtain a clay slurry.

Tosoh-Akzo's triisobutylaluminum (0.36 mmols) and dichloro{1,1'-dimethylsilylene[2-methylbenzo[e]indenyl]-[2-methyl-4-phenyl-4H-azulenyl]}hafnium (exo-syn/exo-anti=10/1 (by mol), 123.6 mg, 175.6 μmols) obtained in Example 3(1) were put into a different flask and reacted to prepare a toluene solution thereof. The complex solution (2.96 μmol/ml, 2.4 ml) was added to the above clay slurry, and stirred at room temperature for 10 minutes. Toluene was added to it for controlling the concentration thereof, and a catalyst slurry (50.0 mg/ml) was obtained.

Next, 3.0 ml of the catalyst slurry and 50 ml of toluene were put into a 2-liter induction-stirring autoclave with a built-in anchor-shaped stirring blade that had been purged with pure nitrogen. Further, toluene (2.5 ml) containing triisobutylaluminum (0.25 mmols) was put in the catalyst feeder set in the autoclave, and liquefied propylene (50 g) was introduced into the autoclave and prepolymerized at 30° C. for 10 minutes. After the prepolymerization, propylene remaining in the autoclave was purged away, and triisobutylaluminum in the catalyst feeder was led into the autoclave under pressure.

(3) Propylene Homopolymerization (Formation of Block (I)):

650 ml of toluene and 150 g of liquefied propylene were put into the autoclave containing the prepolymerized catalyst obtained in Example 5(2) therein. Next, this was heated up to 50° C., and the polymerization was started. At 50° C., the inner pressure in the autoclave was 0.7 MPa. Additional liquefied propylene was fed into the autoclave at 50° C. for 120 minutes so that the inner pressure 0.7 MPa could be kept constant as such. After 120 minutes, the autoclave was rapidly cooled to 40° C. as the inner temperature thereof. During this, the monomer was not purged away.

(4) Propylene/Ethylene Copolymerization (Formation of Block (II)):

A different, 2-liter induction-stirring autoclave was prepared for a buffer tank for ethylene/propylene mixed gas. Ethylene (0.50 MPa) and liquefied propylene (250 g) were fed into the tank, and the overall weight of the tank was measured. The tank was heated and kept at 65° C.

After the step of Example 5(3), the inner temperature of the induction-stirring autoclave used in Example 5(3) was kept at 40° C., and 75 g of liquefied propylene was fed into it. Further, ethylene was introduced at an ethylene partial pressure of 0.60 MPa. Then, the polymerization was started at 40° C. At the start of the polymerization, the inner pressure of the autoclave was 1.0 MPa. The mixed gas was fed into the autoclave from the buffer tank so that the inner pressure of the autoclave could be kept at 1.0 MPa at 40° C. for 90 minutes. After 90 minutes, methanol was introduced into it under pressure to stop the polymerization, and the monomers were purged away.

The contents were collected, and the solvent was removed. 243 g of a polymer, composition of blocks (I) and (II) was obtained. The ethylene/propylene mixed gas consumption during the propylene/ethylene copolymerization was 198 g. During the polymerization, the ethylene concentration in the vapor phase was determined through gas chromatography, and it was 22.1 mol % on average.

Analysis of the resulting polymer gave the following results:

The ethylene content of the block (II) was determined through IR, and it was 4.2 mol %. The MFR of the composition of the blocks (I) and (II) was 10.0 g/10 min. DSC of the composition of blocks (I) and (II) confirmed that the melting point peak thereof was 145.7° C., and the quantity of heat of crystal fusion thereof was 11.2 J/g. The composition was obtained as a rubber-like mass, and its bulk density could not be determined.

(5) Determination of Physical Properties:

The polymer obtained in Example 5(4) was melt-kneaded in a laboratory plastomill according to the method mentioned above to obtain a soft propylene-based resin composition. The thus-obtained soft propylene-based resin composition was formed into press sheet samples with a pressing machine according to the method mentioned above. The press sheet was analyzed for the physical properties. The true density was 0.8694 g/cm$^3$; the D hardness was 82; the tensile modulus was 34 MPa; the tensile elongation at break larger than 941%; the internal ray transmittance was 85.5%; and the melting point was 147.0° C. The press sheet had good flexibility, transparency and heat resistance and was not sticky.

(6) Structure Analysis of Block (I)

In the same manner as in Example 5(3), a block (I) was prepared. The resulting polymer was analyzed by $^{13}$C-NMR, and it gave the following results: The polymer was a stereoblock polypropylene and the microtacticity of the head-to-tail bonding propylene unit chain segments thereof was as follows: mmmm=69.4%, mmmr=7.8%, rmmr=1.0%, mmrr=7.7%, mmrm+rmrr=5.3%, rmrm=2.7%, rrrr=0.9%, rrrm=1.6%, mrrm=3.5%. The ratio of $S_1$ to S was 69.4%; and $4+2S_1/S_2=21.8$.

The amount of the regio-irregular units based on the propylene 2,1-insertion was 0.4% relative to the overall propylene insertion; and the amount of the regio-irregular units based on the propylene 1,3-insertion was 0.3%. The MFR of the polymer was 3.5 g/10 min. DSC of the polymer confirmed that the melting point peak thereof was 146.5° C., and the quantity of heat of crystal fusion thereof was 38.9 J/g.

The invention has been described hereinabove with reference to specific embodiments thereof, in which, however, it is obvious to those skilled in the art that various changes and modifications may be made not overstepping the sprit and the scope of the invention.

INDUSTRIAL APPLICABILITY

The present invention provides propylene-based soft resin compositions having good flexibility, transparency, and heat resistance. The present invention does not require expensive aluminoxanes and organoboron compounds, and enables gas-phase polymerization without requiring a polymerization solvent. Accordingly, by the present invention, propylene-based soft polymers having such good properties can be produced at low costs. The industrial value of the invention is therefore extremely high.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A soft propylene-based resin composition, comprising block (I) and block (II), wherein:

block (I) is a propylene-based polymer having propylene unit chain segments that bond in a mode of head-to-tail bonding, in which the chain segment has an isotactic block-containing stereoblock structure; and wherein block (I) satisfies the following condition (C): (C) a partial structure assigned to a pentad represented by rmrm exists in the head-to-tail-bonding propylene unit chain segments in the polymer, and its proportion is at most 7% relative to all pentads of the head-to-tail-bonding propylene unit chain segments of the polymer; and block (II) is a copolymer of at least propylene and ethylene.

2. A soft propylene-based resin composition, comprising block (I) and block (II), wherein:

block (I) is a propylene-based polymer having propylene unit chain segments that bond in a mode of head-to-tail bonding, in which the chain segment has an isotactic block-containing stereoblock structure; and wherein said block (I) satisfies condition (D): (D) in the methyl carbon-derived $^{13}$C-NMR peak pattern of the head-to-tail-bonding propylene unit chain segments in the polymer, when the chemical shift of the peak top of the peak assigned to the pentad of mmmm is defined as 21.8 ppm, then the ratio of the peak area $S_1$ for the peak top at 21.8 mm to the total area S of the peaks appearing within the range of from 19.8 ppm to 22.2 ppm is from 40% to 95%, and when the peak area for the peak top within the range of from 21.5 to 21.7 ppm is indicated by $S_2$, then $4+(2S_1/S_2)>5$; and block (II) is a copolymer of at least propylene and ethylene.

3. A soft propylene-based resin composition, comprising block (I) and block (II), wherein:

block (I) is a propylene-based polymer having propylene unit chain segments that bond in a mode of head-to-tail bonding, in which the chain segment has an isotactic block-containing stereoblock structure; wherein said isotactic block is a partial structure in which at least four propylenes bond to each other in a mode of head-to-tail bonding and in which the absolute configuration of the methyl groups is the same; and block (II) is a copolymer of at least propylene and ethylene.

4. The soft propylene-based resin composition of claim 3, wherein said block (I) satisfies the following condition (C):

(C) a partial structure assigned to a pentad represented by rmrm exists in the head-to-tail-bonding propylene unit chain segments in the polymer, and its proportion is at most 7% relative to all pentads of the head-to-tail-bonding propylene unit chain segments of the polymer.

5. The soft propylene-based resin composition of claim 4, wherein said block (II) is a copolymer of propylene and ethylene.

6. The soft propylene-based resin composition of claim 4, wherein said block (II) has an ethylene content of from 0.1 mol % to 40 mol %.

7. The soft propylene-based resin composition of claim 4, wherein said block (I) comprises a polymer main chain which has regio-irregular units based on 2,1-inserted propylene monomer and/or 1,3-inserted propylene monomer.

8. The soft propylene-based resin composition of claim 4, wherein said block (I) comprises a polymer main chain which has regio-irregular units based on both 2,1-inserted propylene monomer and 1,3-inserted propylene monomer.

9. The soft propylene-based resin composition of claim 4, which is prepared by polymerization with a single-site catalyst.

10. The soft propylene-based resin composition of claim 9, wherein said single-site catalyst is a metallocene catalyst which comprises:

a catalyst component (A); a $C_1$-symmetric transition metal complex that comprises a conjugated 5-membered ring ligand represented by the following formula (I);

wherein $A^1$ and $A_2$ are each a different conjugated 5-membered ring ligand; and at least one of $A^1$ and $A^2$ is so constituted that neighboring substituents on said conjugated 5-membered ring ligand bond to each other to form, together with the two atoms of the 5-membered ring, a 7- to 10-membered condensed ring;

Q represents a bridging group which combines said two conjugated 5-membered ring ligands at any desired position; M represents a transition metal atom selected from Group 4 of the Periodic Table; and X and Y each independently represents, bonding to M, a hydrogen atom, a halogen atom, a hydrocarbon group, an amino group, a halogenohydrocarbon group, an oxygen-containing hydrocarbon group, a nitrogen-containing hydrocarbon group, a phosphorus-containing hydrocarbon group, or a silicon-containing hydrocarbon group.

11. The soft propylene-based resin composition of claim 9, wherein said single-site catalyst further comprises a cocatalyst (B), and wherein the catalyst component (B) comprises; an ion-exchangeable layered compound, except silicates, or an inorganic silicate.

12. The soft propylene-based resin composition of claim 11, wherein said cocatalyst component (B) further comprises;

a catalyst component (C), which is an organoaluminum compound.

13. The soft propylene-based resin composition of claim 3, wherein said block (I) satisfies condition (D): (D) in the methyl carbon-derived $^{13}$C-NMR peak pattern of the head-to-tail-bonding propylene unit chain segments in the polymer, when the chemical shift of the peak top of the peak assigned to the pentad of mmmm is defined as 21.8 ppm, then the ratio of the peak area $S^1$ for the peak top at 21.8 mm to the total area S of the peaks appearing within the range of from 19.8 ppm to 22.2 ppm is from 40% to 95%, and when the peak area for the peak top within the range of from 21.5 to 21.7 ppm is indicated by $S_2$, then $4+(2S_1/S_2)>5$.

14. The soft propylene-based resin composition of claim 13, wherein said ratio of the peak area $S_1$ to the total area S is from 40% to 89.9%.

15. The soft propylene-based resin composition of claim 13, wherein said ratio of the peak area $S_1$ to the total area S is from 40% to 76.4%.

16. The soft propylene-based resin composition of claim 13, wherein said block (II) is a copolymer of propylene and ethylene.

17. The soft propylene-based resin composition of claim 13, wherein said block (II) has an ethylene content of from 0.1 mol % to 40 mol %.

18. The soft propylene-based resin composition of claim 13, wherein said block (I) comprises a polymer main chain which has regio-irregular units based on 2,1-inserted propylene monomer and/or 1,3-inserted propylene monomer.

19. The soft propylene-based resin composition of claim 13, wherein said block (I) comprises a polymer main chain which has regio-irregular units based on both 2,1-inserted propylene monomer and 1,3-inserted propylene monomer.

20. The soft propylene-based resin composition of claim 13, which is prepared by polymerization with a single-site catalyst.

21. The soft propylene-based resin composition of claim 20, wherein said single-site catalyst is a metallocene catalyst which comprises:

a catalyst component (A); a $C_1$-symmetric transition metal complex that comprises a conjugated 5-membered ring ligand represented by the following formula (I);

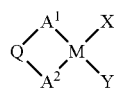
(I)

wherein $A^1$ and $A^2$ are each a different conjugated 5-membered ring ligand; and at least one of $A^1$ and $A^2$ is so constituted that neighboring substituents on said conjugated 5-membered ring ligand bond to each other to form, together with the two atoms of the 5-membered ring, a 7- to 10-membered condensed ring;

Q represents a bridging group which combines said two conjugated 5-membered ring ligands at any desired position; M represents a transition metal atom selected from Group 4 of the Periodic Table; and X and Y each independently represents, bonding to M, a hydrogen atom, a halogen atom, a hydrocarbon group, an amino group, a halogenohydrocarbon group, an oxygen-containing hydrocarbon group, a nitrogen-containing hydrocarbon group, a phosphorus-containing hydrocarbon group, or a silicon-containing hydrocarbon group.

22. The soft propylene-based resin composition of claim 21, wherein said single-site catalyst further comprises a cocatalyst (B), and wherein the catalyst component (B) comprises; an ion-exchangeable layered compound, except silicates, or an inorganic silicate.

23. The soft propylene-based resin composition of claim 22, wherein said cocatalyst component (B) further comprises:

a catalyst component (C), which is an organoaluminum compound.

* * * * *